(12) United States Patent
Lange et al.

(10) Patent No.: US 6,946,413 B2
(45) Date of Patent: Sep. 20, 2005

(54) COMPOSITE MATERIAL WITH CLOTH-LIKE FEEL

(75) Inventors: Scott R. Lange, Oshkosh, WI (US); Kenneth B. Close, New London, WI (US); David J. Baer, Oshkosh, WI (US); Charles A. Smith, Snellville, GA (US); Richard C. Beck, Solgohachia, AR (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 44 days.

(21) Appl. No.: 09/751,329

(22) Filed: Dec. 29, 2000

(65) Prior Publication Data

US 2002/0127937 A1 Sep. 12, 2002

(51) Int. Cl.$^7$ ............................. D04H 1/00; D03D 15/00
(52) U.S. Cl. ...................... 442/327; 442/228; 442/381; 428/314; 428/313
(58) Field of Search ................ 442/327, 228, 442/381; 428/314, 313

(56) References Cited

U.S. PATENT DOCUMENTS

| | | | |
|---|---|---|---|
| 2,957,512 A | 10/1960 | Wade ..................... 154/33.05 |
| 3,316,136 A | 4/1967 | Pufahl ..................... 156/160 |
| 3,644,157 A | 2/1972 | Draper ..................... 156/160 |
| 3,676,242 A | 7/1972 | Prentice ..................... 156/62.4 |
| 3,687,797 A | 8/1972 | Wideman ..................... 161/129 |
| 3,692,618 A | 9/1972 | Dorschner et al. ............. 161/72 |
| 3,849,241 A | 11/1974 | Butin et al. ................... 161/169 |
| 3,962,618 A | 6/1976 | Burton et al. ................ 318/561 |
| 3,989,788 A | 11/1976 | Estes, Jr. et al. ............ 264/120 |
| 4,100,324 A | 7/1978 | Anderson et al. ........... 428/288 |
| 4,209,563 A | 6/1980 | Sisson ......................... 428/288 |
| 4,323,534 A | 4/1982 | DesMarais ............... 264/176 R |
| 4,333,782 A | 6/1982 | Pieniak ...................... 156/164 |
| 4,340,563 A | 7/1982 | Appel et al. .................. 264/518 |
| 4,355,425 A | 10/1982 | Jones et al. ..................... 2/402 |
| 4,418,123 A | 11/1983 | Bunnelle et al. ............. 428/517 |
| 4,426,420 A | 1/1984 | Likhyani ..................... 428/224 |
| 4,436,780 A | 3/1984 | Hotchkiss et al. ........... 428/198 |
| 4,543,099 A | 9/1985 | Bunnelle et al. ......... 604/385.24 |
| 4,548,856 A | 10/1985 | Ali Khan et al. ........... 428/171 |

(Continued)

FOREIGN PATENT DOCUMENTS

| | | | |
|---|---|---|---|
| DE | 29705157 | 12/1997 | ........... B65D/33/14 |
| EP | 0006647 | 7/1983 | ........... A61F/13/20 |
| EP | 0096546 | 5/1987 | ........... A47K/10/42 |
| EP | 0130764 | 1/1988 | ........... A61L/15/00 |
| EP | 0302382 | 2/1989 | ........... A47K/10/42 |
| EP | 0415758 | 3/1991 | ........... B32B/27/12 |
| EP | 0456044 | 11/1991 | ............ D04H/1/42 |
| EP | 0286538 | 1/1992 | ........... B65D/83/08 |
| EP | 0371802 | 11/1992 | ............ A61K/7/48 |
| EP | 0371804 | 3/1993 | ............ A61K/7/48 |
| EP | 0218473 | 7/1993 | ............ D04H/1/56 |
| EP | 0291211 | 7/1993 | ........... B65H/45/24 |
| EP | 0410937 | 12/1993 | ........... B65D/83/08 |
| EP | 0575123 | 12/1993 | ............ C08L/23/08 |
| EP | 0605831 | 7/1994 | ............ C08K/3/00 |
| EP | 0343978 | 11/1994 | ............ D04H/5/08 |
| EP | 0500590 | 7/1995 | ............ B32B/5/04 |
| EP | 0606234 | 10/1995 | ............ D04H/1/56 |
| EP | 0606235 | 10/1995 | ............ D04H/1/56 |
| EP | 0606242 | 12/1995 | ............ D04H/1/56 |

(Continued)

Primary Examiner—Alexis A. Wachtel
Assistant Examiner—Virginia Manoharan
(74) Attorney, Agent, or Firm—Schwegman, Lundberg Woessner & Kluth P.A.

(57) ABSTRACT

The present invention provides a wet-wipe comprising a non-woven composite elastic material comprising a non-woven elastic layer; and a non-woven gatherable layer. The gatherable layer is bonded to the elastic layer at at least two points; and is gathered between the bonded points. These wet-wipes have a softer more cloth like feel.

36 Claims, 12 Drawing Sheets

U.S. PATENT DOCUMENTS

| | | | | |
|---|---|---|---|---|
| 4,555,811 | A | 12/1985 | Shimalla | 2/51 |
| 4,600,620 | A | 7/1986 | Lloyd et al. | 428/195.1 |
| 4,604,313 | A | 8/1986 | McFarland et al. | 428/172 |
| 4,606,964 | A | 8/1986 | Wideman | 428/152 |
| 4,640,726 | A | 2/1987 | Sallee et al. | 156/85 |
| 4,663,106 | A | 5/1987 | Pomplun et al. | 264/230 |
| 4,663,220 | A | 5/1987 | Wisneski et al. | 428/221 |
| 4,692,368 | A | 9/1987 | Taylor et al. | 428/137 |
| 4,720,415 | A | 1/1988 | Vander Wielen et al. | 428/152 |
| 4,741,941 | A | 5/1988 | Englebert et al. | 428/71 |
| 4,741,944 | A | 5/1988 | Jackson et al. | 428/152 |
| 4,741,949 | A | 5/1988 | Morman et al. | 428/224 |
| 4,781,966 | A | 11/1988 | Taylor | 428/152 |
| 4,787,699 | A | 11/1988 | Moulin | 350/96.21 |
| 4,803,117 | A | 2/1989 | Daponte | 428/228 |
| 4,808,252 | A | 2/1989 | Lash | 156/73.1 |
| 4,849,049 | A | 7/1989 | Colton | 156/291 |
| 4,865,221 | A | 9/1989 | Jackson et al. | 221/48 |
| 4,910,064 | A | 3/1990 | Sabee | 428/113 |
| 4,965,122 | A | 10/1990 | Morman | 428/225 |
| 4,996,091 | A | 2/1991 | McIntyre | 428/113 |
| 5,144,729 | A | 9/1992 | Austin et al. | 28/105 |
| 5,165,979 | A | 11/1992 | Watkins et al. | 428/113 |
| 5,180,620 | A | 1/1993 | Mende | 428/138 |
| 5,200,246 | A * | 4/1993 | Sabee | 428/109 |
| 5,223,319 | A | 6/1993 | Cotton et al. | 428/131 |
| 5,324,800 | A | 6/1994 | Welborn, Jr. et al. | 526/160 |
| 5,350,624 | A | 9/1994 | Georger et al. | 428/219 |
| 5,376,198 | A | 12/1994 | Fahrenkrug et al. | 156/164 |
| 5,385,775 | A | 1/1995 | Wright | 428/284 |
| 5,415,925 | A | 5/1995 | Austin et al. | 428/287 |
| 5,455,110 | A | 10/1995 | Connor | 428/286 |
| 5,498,463 | A | 3/1996 | McDowall et al. | 428/198 |
| 5,508,102 | A | 4/1996 | Georger et al. | 428/297 |
| 5,520,308 | A | 5/1996 | Berg, Jr. et al. | 221/50 |
| 5,542,567 | A | 8/1996 | Julius | 221/63 |
| 5,560,974 | A | 10/1996 | Langley | 428/198 |
| 5,575,874 | A | 11/1996 | Griesbach, III et al. | 156/167 |
| 5,616,408 | A | 4/1997 | Oleszczuk et al. | 442/346 |
| D384,508 | S | 10/1997 | Zander et al. | D5/26 |
| 5,766,737 | A | 6/1998 | Willey et al. | 428/198 |
| 5,785,179 | A | 7/1998 | Buczwinski et al. | 206/494 |
| 5,834,385 | A | 11/1998 | Blaney et al. | 442/382 |
| 5,962,112 | A | 10/1999 | Haynes et al. | 428/198 |
| D418,305 | S | 1/2000 | Zander et al. | D5/27 |
| 6,028,018 | A | 2/2000 | Amundson et al. | 442/381 |
| 6,429,261 | B1 | 8/2002 | Lang et al. | 525/191 |
| 6,610,173 | B1 | 8/2003 | Lindsay et al. | |
| 2001/0009711 | A1 | 7/2001 | Latimer et al. | |

FOREIGN PATENT DOCUMENTS

| | | | |
|---|---|---|---|
| EP | 0544156 | 6/1996 | B65D/83/08 |
| EP | 0699163 | 1/1997 | B65D/83/08 |
| EP | 0713546 | 3/1997 | D04H/13/00 |
| EP | 0715661 | 10/1997 | D04H/1/56 |
| EP | 0644130 | 5/1998 | B65D/83/08 |
| EP | 0714254 | 5/1998 | A47K/10/42 |
| EP | 0747313 | 5/1998 | B65H/45/24 |
| EP | 0857453 | 8/1998 | A47K/10/42 |
| EP | 0546837 | 11/1998 | D04H/1/56 |
| EP | 0875609 | 11/1998 | D01F/8/06 |
| EP | 0879575 | 11/1998 | A47K/10/42 |
| EP | 0714351 | 12/1998 | B32B/27/12 |
| EP | 0712304 | 4/1999 | A61F/13/15 |
| EP | 0955247 | 11/1999 | B65D/83/08 |
| EP | 0955260 | 11/1999 | B65H/45/28 |
| EP | 0970909 | 1/2000 | B65H/45/24 |
| EP | 0978247 | 2/2000 | A47K/10/42 |
| EP | 0980841 | 2/2000 | B65H/45/24 |
| EP | 0983739 | 3/2000 | A47K/10/42 |
| EP | 0983740 | 3/2000 | A47K/10/42 |
| EP | 0670385 | 4/2000 | D04H/13/00 |
| EP | 0748748 | 5/2000 | B65D/83/08 |
| EP | 1000577 | 5/2000 | A47K/10/42 |
| EP | 1002746 | 5/2000 | B65D/83/08 |
| EP | 1044894 | 10/2000 | B65D/83/08 |
| EP | 1090868 | 4/2001 | B65H/45/24 |
| EP | 0986322 | 12/2001 | A47L/13/16 |
| GB | 2130965 | 6/1984 | B32B/7/04 |
| GB | 2106862 | 4/1993 | B65D/85/67 |
| WO | WO-93/15248 | 8/1993 | D04H/1/48 |
| WO | WO-94/12699 | 6/1994 | D01F/6/30 |
| WO | WO-94/28219 | 12/1994 | D01F/6/06 |
| WO | WO-95/03171 | 2/1995 | B32B/5/04 |
| WO | WO-96/16216 | 5/1996 | D04H/1/04 |
| WO | WO-96/21475 | 7/1996 | A61L/15/30 |
| WO | WO-96/26664 | 9/1996 | A47K/10/24 |
| WO | WO-97/02130 | 1/1997 | B29C/61/02 |
| WO | WO-97/23677 | 7/1997 | |
| WO | WO-97/43938 | 11/1997 | A47K/10/42 |
| WO | 98/03713 | 1/1998 | D04H/13/00 |
| WO | WO-98/06640 | 2/1998 | B65D/83/08 |
| WO | WO-98/23519 | 6/1998 | B65H/45/22 |
| WO | WO-98/29018 | 7/1998 | A47K/10/42 |
| WO | WO-98/52453 | 11/1998 | A47K/10/24 |
| WO | WO-98/52454 | 11/1998 | A47K/10/42 |
| WO | 99/24551 | 5/1999 | C11D/17/04 |
| WO | 00/38565 | 7/2000 | A47L/13/17 |
| WO | 00/48834 | 8/2000 | B32B/27/32 |
| WO | WO-01/00917 | 1/2001 | D04H/13/00 |

* cited by examiner

Heat Activation Unit

COMPOSITE MATERIAL WITH CLOTH-LIKE FEEL

BACKGROUND OF THE INVENTION

Fibrous non-woven materials and fibrous non-woven composite materials are widely used as products, or as components of products, such as wet-wipes because they can be manufactured inexpensively and made to have specific characteristics. These products can be manufactured so inexpensively that they can be viewed as disposable, as opposed to reusable.

One approach to making fibrous non-woven composite materials for wet-wipes the use of homogeneous mixtures of materials such as air laid webs of fibers mixed with cellulosic fibers or another absorbent material. Other wet-wipes have been prepared by joining different types of non-woven materials in a laminate or formed as a layered structure. These products can be prepared from plastic materials such as plastic sheets, films and non-woven webs, prepared by extrusion processes such as, for example, slot film extrusion, blown bubble film extrusion, meltblowing of non-woven webs and spinbonding.

The non-woven materials and laminated non-woven materials that are useful for consumer products should meet minimum product standards for strength, moisture level, size, flexibility, thickness, softness and texture. However, if one of these parameters is changed this can affect another of the parameters. Thus, a goal for these laminates is to produce a product that can mimic a soft cloth-like feel or at least get closer to a soft cloth-like feel than has been previously possible while still maintaining acceptable strength.

Such a soft cloth-like feel is often characterized by, among other things, one or more of the following: thickness, bulk density, flexibility, texture, softness, density, and durability of the non-woven materials. These materials are suitable for disposable products such as, for example, disposable diapers, disposable tissues and disposable wipes, for example, disposable wet wipes.

Definitions

For the purposes of the present application, the following terms shall have the following meanings:

The term "elastic" as used herein, means any material which, upon application of a biasing force, is stretchable, that is, elongatable at least about 60 percent (i.e., to a stretched, biased length which is at least about 160 percent of its relaxed unbiased length), and which, can recover at least 55 percent of its elongation upon release of the stretching, elongating force. A hypothetical example would be a one (1) cm sample of a material which is elongatable to at least 1.60 cm and which, upon being elongated to 1.60 cm and released, can recover to a length of not more than 1.27 cm. Many elastic materials can be elongated by much more than 60 percent (i.e., much more than 160 percent of their relaxed length), for example, elongated 100 percent or more, and many of these can recover to substantially their initial relaxed length, for example, to within 105 percent of their original relaxed length, upon release of the stretching force.

As used herein, the term "non-elastic" refers to any material which does not fall within the definition of "elastic," above.

As used herein the term "non-woven web" means a structure or a web of material which has been formed without use of weaving processes to produce a structure of individual fibers or threads which are intermeshed, but not in an identifiable, repeating manner. Non-woven webs have been, in the past, formed by a variety of conventional processes such as, for example, meltblowing processes, spinbonding processes, film aperturing processes and staple fiber carding processes.

The terms "recover" and "recovery" as used herein refer to a contraction of a stretched material upon termination of a biasing force following stretching of the material by application of the biasing force. For example, if a material having a relaxed, unbiased length of one (1) cm is elongated 50 percent by stretching to a length of one and one half (1.5) cm the material would be elongated 50 percent (0.5 cm) and would have a stretched length that is 150 percent of its relaxed length. If this exemplary stretched material contracted, that is recovered to a length of one and one tenth (1.1) cm after release of the biasing and stretching force, the material would have recovered 80 percent (0.4 cm) of its one-half (0.5) cm elongation. Recovery can be expressed as [(maximum stretch length—final sample length)/(maximum stretch length—initial sample length)] times 100.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which can be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spun-bonding mechanisms. The production of spun-bonded non-woven webs is illustrated in patents such as, for example, in U.S. Pat. No. 4,340,563 to Appel et al., and U.S. Pat. No. 3,692,618 to Dorschner et al.

As used herein, the term "coform" means a non-woven composite material of air-formed matrix material comprising thermoplastic polymeric meltblown fibers such as, for example, microfibers having an average fiber diameter of less than about 10 microns, and a multiplicity of individualized absorbent fibers such as, for example, wood pulp fibers disposed throughout the matrix of polymer microfibers and engaging at least some of the microfibers to space the microfibers apart from each other. The absorbent fibers are interconnected by and held captive within the matrix of microfibers by mechanical entanglement of the microfibers with the absorbent fibers, the mechanical entanglement and interconnection of the microfibers and absorbent fibers alone forming a coherent integrated fibrous structure. These materials are prepared according to the descriptions in U.S. Pat. No. 4,100,324 to Anderson et al. U.S. Pat. No. 5,508,102 to Georger et al. and U.S. Pat. No. 5,385,775 to Wright.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein, the term "autogenous bonding" means bonding provided by fusion and/or self-adhesion of fibers and/or filaments without an applied external adhesive or bonding agent. Autogenous bonding can be provided by contact between fibers and/or filaments while at least a portion of the fibers and/or filaments are semi-molten or tacky. Autogenous bonding may also be provided by blending a tackifying resin with the thermoplastic polymers used to form the fibers and/or filaments. Fibers and/or filaments formed from such a blend can be adapted to self-bond with or without the application of pressure and/or heat. Solvents may also be used to cause fusion of fibers and filaments which remains after the solvent is removed.

As used herein, the term "machine direction (MD)" refers to the direction of travel of the forming surface onto which fibers are deposited during formation of a non-woven fibrous web.

As used herein, the term "cross-machine direction (CD)" refers to the direction which is essentially perpendicular to the machine direction defined above.

As used herein, the term "tensile strength" refers to the maximum load or force (i.e., peak load) encountered while elongating the sample to break. Measurements of peak load are made in the machine and cross-machine directions using wet samples.

As used herein, the term "wet wipe" refers to a fibrous sheet which, during its manufacture, has a liquid applied thereto so that the liquid can be retained on or within the fibrous sheet until its utilization by a consumer. The liquid may include a fragrance and/or an emollient and may serve to aid the fibrous sheet in retention of materials which are to be wiped up during its utilization.

As used herein, the terms "stretch-bonded laminate" or "composite elastic material" refers to a fabric material having at least one layer of non-woven web with at least one of the layer of non-woven web being elastic and at least one layer of the non-woven web being non-elastic, e.g., a gatherable layer. The elastic non-woven web layer(s) are joined or bonded to at least at least two locations to the non-elastic non-woven web layer(s). Preferably, the bonding is at intermittent bonding points or areas while the non-woven web layer(s) are in juxtaposed configuration and while the elastic non-woven web layer(s) have a tensioning force applied thereto in order to bring the elastic non-woven web to a stretched condition. Upon removal of the tensioning force after joining of the web layers, an elastic non-woven web layer will attempt to recover to its unstretched condition and will thereby gather the non-elastic non-woven web layer between the points or areas of joining of the two layers. The composite material is elastic in the direction of stretching of the elastic layer during joining of the layers and can be stretched until the gathers of the non-elastic non-woven web or film layer have been removed. A stretch-bonded laminate may include more than two layers. For example, the elastic non-woven web or film may have a non-elastic non-woven web layer joined to both of its sides while it is in a stretched condition so that a three layer non-woven web composite is formed having the structure of gathered non-elastic (non-woven web or film)/elastic (non-woven web or film)/gathered non-elastic (non-woven web or film). Yet other combinations of elastic and non-elastic layers can also be utilized. Such composite elastic materials are disclosed, for example, by U.S. Pat. No. 4,720,415 to Vander Wielen et al., and U.S. Pat. No. 5,385,775 to Wright.

As used herein "thermal point bonding" involves passing a material such as two or more webs of fibers to be bonded between a heated calandar roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. In one embodiment of this invention the bond pattern allows void spaces in the machine direction to allow a gatherable layer to gather when the web retracts.

As used herein the term "superabsorbent" refers to a water swellable, substantially insoluble organic or inorganic material capable of absorbing at least 10 times its weight of an aqueous solution containing 0.9 wt % of sodium chloride.

As used herein the term "palindromic" means a multilayer laminate, for example a stretch-bonded laminate, which is substantially symmetrical. Examples of palindromic laminates could have layer configurations of A/B/A, A/B/B/A, A/A/B/B/A/A, A/B/C/B/A, and the like. Examples of non-palindromic layer configurations would include A/B/C, A/B/C/A, A/B/C/D, etc.

As used herein the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

SUMMARY OF THE INVENTION

The problem of lack of softness or cloth-like feel associated with previous composite elastic materials has been addressed by the composite elastic material of the present invention, which is adapted to provide a more cloth like feel than otherwise available. This can be accomplished by providing a non-woven composite material having a low cup crush (i.e., increased flexibility) and a low density (i.e., maximum bulk per unit mass), while maintaining a desired level of strength and tear resistance (i.e., sufficient tensile strength in both machine direction, MD, and in cross-machine direction, CD).

The composite elastic material of the present invention contains at least one elastic layer including a non-woven layer, optionally having embedded elastic fibers and at least one gatherable layer joined at spaced apart locations to the elastic layer so that the gatherable layer is gathered between the spaced-apart locations.

The gatherable layer can be a non-woven web of fibers, such as, for example, spunbonded webs, meltblown webs, air laid layer webs, bonded carded webs, hydroentangled webs, wet-formed (wet laid) webs or any combination thereof. The gatherable layer may also be a mixture of fibers and one or more other materials such as, for example, wood pulp, staple-length fibers, particulates and super-absorbent materials. Such mixtures can be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, to Anderson et al.

The elastic layer can be an elastic film, an elastic web, elastic fibers or any combination thereof such as, for example, an elastic web containing elastic fibers. The elastic webs can contain at least one layer of elastomeric meltblown fibers and optionally at least one layer of substantially parallel rows of elastomeric fibers. The elastomeric fibers can be in substantially parallel rows and can be autogenously bonded to at least a portion of the meltblown fibers. This bonding can take place, for example, by forming molten elastomeric fibers directly on a layer of meltblown fibers to provide the autogenous bonding.

The elastomeric fibers of the invention can have an average diameter ranging from about 40 to about 750 microns. For example, in a preferred embodiment the elastomeric fibers can have an average diameter ranging from about 100 to about 500 microns. More preferred elastomeric fibers can range from about 250 to about 350 microns and can make up at least about 20 percent, by weight, of the non-woven elastic fibrous web layer. Preferably, the non-woven elastic fibrous web layer can contain from about 20 to about 100 percent, by weight, of elastomeric fibers.

In one aspect of the present invention, the composite elastic material of the present invention can have a cup crush of less than about 120 g cm. A preferred composite elastic material of the present invention can have a cup crush of less than about 115 g cm. A more preferred composite elastic material of the present invention can have a cup crush of less than about 110 g cm. A slightly more preferred composite elastic material of the present invention can have a cup crush of less than about 100 g cm. A much more preferred composite elastic material of the present invention can have a cup crush of less than about 90 g cm. A very much more preferred composite elastic material of the present invention can have a cup crush of less than about 80 g cm. The most preferred composite elastic material of the present invention can have a cup crush of less than about 70 g cm.

In another aspect of the present invention, the composite elastic material can have a cup crush range of from about 70 g cm to about 90 g cm.

The composite elastic material of the present invention can have a density less than about 0.085 g per cubic cm. Preferably, the composite elastic material of the present invention can have a density less than about 0.075 g per cubic cm. More preferably, the composite elastic material of the present invention can have a density less than about 0.070 g per cubic cm. Most preferably, the composite elastic material of the present invention can have a density less than about 0.060 g per cubic cm.

In another aspect of the present invention, the composite elastic material can have a density range of from about 0.060 g cm$^3$ to about 0.075 g cm$^3$.

The composite elastic material of the present invention can have a cup crush to density ratio from about 1579 cm$^2$ to about 950 cm$^2$. The preferred cup crush to density ratio for the composite elastic material is from about 1500 cm$^2$ to about 1000 cm$^2$. A more preferred cup crush to density ratio for the composite elastic material is from about 1400 cm$^2$ to about 1100 cm$^2$. The most preferred cup crush to density ratio for the composite elastic material is from about 1300 cm$^2$ to about 1100 cm$^2$.

The composite elastic material can have a CD tensile strength of greater than about 308.4 gm. The preferred CD tensile strength is of greater than about 317.5 gm. A more preferred CD tensile strength is of greater than about 340.2 gm. A slightly more preferred CD tensile strength is of greater than about 362.9 gm. A yet more preferred CD tensile strength is of greater than about 385.6 gm. A much more preferred CD tensile strength is of greater than about 408.2 gm. A very much more preferred CD tensile strength is of greater than about 430.9 gm. The most preferred CD tensile strength is of greater than about 453.6 gm.

In another aspect of the present invention, the composite elastic material can have a CD tensile strength of from about 317.5 gm lbs to about 362.9 gm.

The composite elastic material of the present invention can have a basis weight of about 75 g/m$^2$ to about 90 g/m$^2$. Preferably, the composite elastic material can have a basis weight of about 85 g/m$^2$.

DETAILED DESCRIPTION

Figure 1:
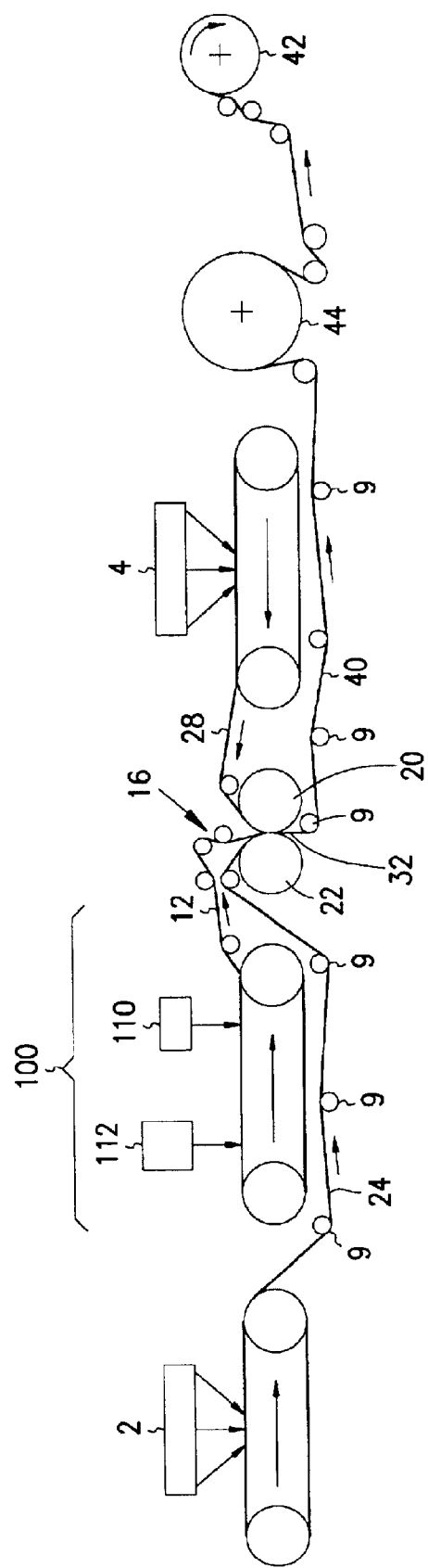
FIG. 1 is a schematic drawing of an exemplary process for forming a composite elastic material of the present invention.

The present invention provides a composite elastic material such as, for example, a stretch-bonded laminate which is adapted to provide improved softness and cloth-like feel. This can be accomplished by providing, a non-woven composite material having a low cup crush and a low density, while maintaining a desired level of strength and tear resistance. This composite elastic material can include an elastic fibrous web that can be a composite of elastomeric fiber and elastomeric meltblown fibers.

The wet-wipes of the present invention provide improved softness and cloth-like feel because they have a combination of properties, having a low cup crush (ie., increased flexibility) and a low density (i.e., maximum bulk per unit mass), while maintaining a desired level of strength and tear resistance (ie., sufficient tensile strength in both MD and CD) that were not previously available in wet-wipes. The feel of a wet-wipe is often characterized by one or more of the following attributes of the non-woven materials that comprise them: thickness, bulk density, flexibility, texture, softness, and durability. In preparing a wet-wipe having a soft cloth-like feel, it is important to balance the properties of the composite elastic material, e.g., cup crush, density, and tensile strength. However, this is a difficult task because these properties can be interdependent, i.e., changing one property can adversely affect another property (and the overall feel of the wet-wipe). Typically, when the basis weight is decreased, the cup-crush is decreased, and tensile strength is decreased. When the basis weight is decreased then the reverse changes occur. Thus, when a property is varied, to enhance the softness, careful attention should be paid to the results obtained to avoid a resultant product having less desirable overall properties.

In light of these difficulties, through experimentation, the inventors have discovered certain properties to selectively isolate and vary to obtain a more cloth-like feel for a non-woven wipe than before possible. In the present invention, the inventors have discovered the basis weight can be increased and the cup-crush can be decreased while still maintaining the tensile strength. By way of example and without limitation, the non-woven wipes of the invention can have properties and their ranges such as, for example, a density less than about 0.085 g cm$^3$; a cup crush less than about 120 g per cm and a CD tensile strength of greater than about 0.68 pounds.

The wet-wipes of the invention include a non-woven composite elastic material having at least one non-woven elastic layer and at least one non-woven gatherable layer. The gatherable layer is bonded to the elastic layer at at least two points; and is gathered between the bonded points. The elastic layer can have a non-woven web having embedded elastic fibers, arranged in a substantially parallel configuration.

The composite elastic material has a density less than about 0.085 g per cubic cm and a CD tensile strength of greater than about 0.68 pounds. The composite material can have a cup crush less than about 120 g per cm and can have a cup crush to density ratio of less than about 1579 cm$^2$ and greater than about 950 cm$^2$. Preferably, the cup crush to density ratio can be less than about 1500 cm$^2$ and greater than about 1000 cm$^2$. More preferably, the cup crush to density ratio can be less than about 1400 cm$^2$ and greater than about 1100. Most preferably, the cup crush to density ratio can be less than about 1300 cm$^2$ and greater than about 1100.

The preferred CD tensile strength is of greater than about 0.70 lbs. A more preferred CD tensile strength is of greater than about 0.75 lbs. A slightly more preferred CD tensile strength is of greater than about 0.80 lbs. A yet more preferred CD tensile strength is of greater than about 0.85 lbs. A much more preferred CD tensile strength is of greater than about 0.90 lbs. A very much more preferred CD tensile strength is of greater than about 0.95 lbs. The most preferred CD tensile strength is of greater than about 1.0 lbs.

The basis weight (in grams per square meter, g/m$^2$ or gsm) is calculated by dividing the dry weight by the area (in square meters). The density of the wet-wipe, as used herein, is a "wet density" and is calculated as the basis weight (in grams per square meter, g/m$^2$ or gsm) divided by the thickness of the wet-wipe after wetting with the solution.

The wet-wipes of the present invention comprise a composite elastic material and a liquid. The liquid can be any solution which can be absorbed into the wet-wipe composite elastic material and may include any suitable components which provide the desired wiping properties. For example, the components may include water, emollients, surfactants, fragrances, preservatives, chelating agents, pH buffers or combinations thereof as are well known to those skilled in the art. The liquid may also contain lotions and/or medicaments.

The amount of liquid contained within each wet-wipe may vary depending upon the type of material being used to provide the wet-wipe, the type of liquid being used, the type of container being used to store the wet-wipes, and the desired end use of the wet-wipe. Generally, each wet-wipe can contain from about 150 to about 600 weight percent and preferably from about 250 to about 450 weight percent liquid based on the dry weight of the wipe for improved wiping. In a more preferred aspect, the amount of liquid contained within the wet-wipe is from about 300 to about 400 weight percent and desirably about 330 weight percent based on the dry weight of the wet-wipe. If the amount of liquid is less than the above-identified ranges, the wet-wipe can be too dry and may not adequately perform. If the amount of liquid is greater than the above-identified ranges, the wet-wipe can be oversaturated and soggy and the liquid may pool in the bottom of the container.

Each wet-wipe is generally rectangular in shape and may have any suitable unfolded width and length. For example, the wet-wipe may have an unfolded length of from about 2.0 to about 80.0 centimeters and desirably from about 10.0 to about 25.0 centimeters and an unfolded width of from about 2.0 to about 80.0 centimeters and desirably from about 10.0 to about 25.0 centimeters. Preferably, each individual wet-wipe is arranged in a folded configuration and stacked one on top of the other to provide a stack of wet-wipes or interfolded in a configuration suitable for pop-up dispensing. Such folded configurations are well known to those skilled in the art and include c-folded, z-folded, quarter-folded configurations and the like. The stack of folded wet-wipes can be placed in the interior of a container, such as a plastic tub, to provide a package of wet-wipes for eventual sale to the consumer. Alternatively, the wet-wipes may include a continuous strip of material which has perforations between each wipe and which can be arranged in a stack or wound into a roll for dispensing.

The layered composite elastic material of the wet-wipes of the present invention includes at least two layers of material having different physical properties. The different physical properties which a layer can be configured to provide by selecting the appropriate materials include softness, resiliency, strength, flexibility, integrity, toughness, absorbency, liquid retention, thickness, tear resistance, surface texture, drapability, hand, wetability, wicking ability and the like and combinations thereof. Preferably, the materials used for the layered composite elastic material are configured to provide softness and flexibility while maintaining adequate strength, integrity and resiliency, particularly when wetted. For example, the wet-wipes may include at least one layer of material which is configured to provide strength and resilience to the wet-wipe and at least one other layer which is configured to provide a soft, gentle wiping surface to the wet-wipe. Preferably, the wet-wipes include a soft layer on each side of a strong and resilient layer such that both exposed surfaces of the wipe provide a soft, gentle surface for contact with the skin.

Referring now to the drawings wherein like reference numerals represent the same or equivalent structure and, in particular, to FIG. 1 of the drawings there is schematically illustrated a process 10 for forming a stretch-bonded laminate which includes an elastic fibrous web.

Figure 2:
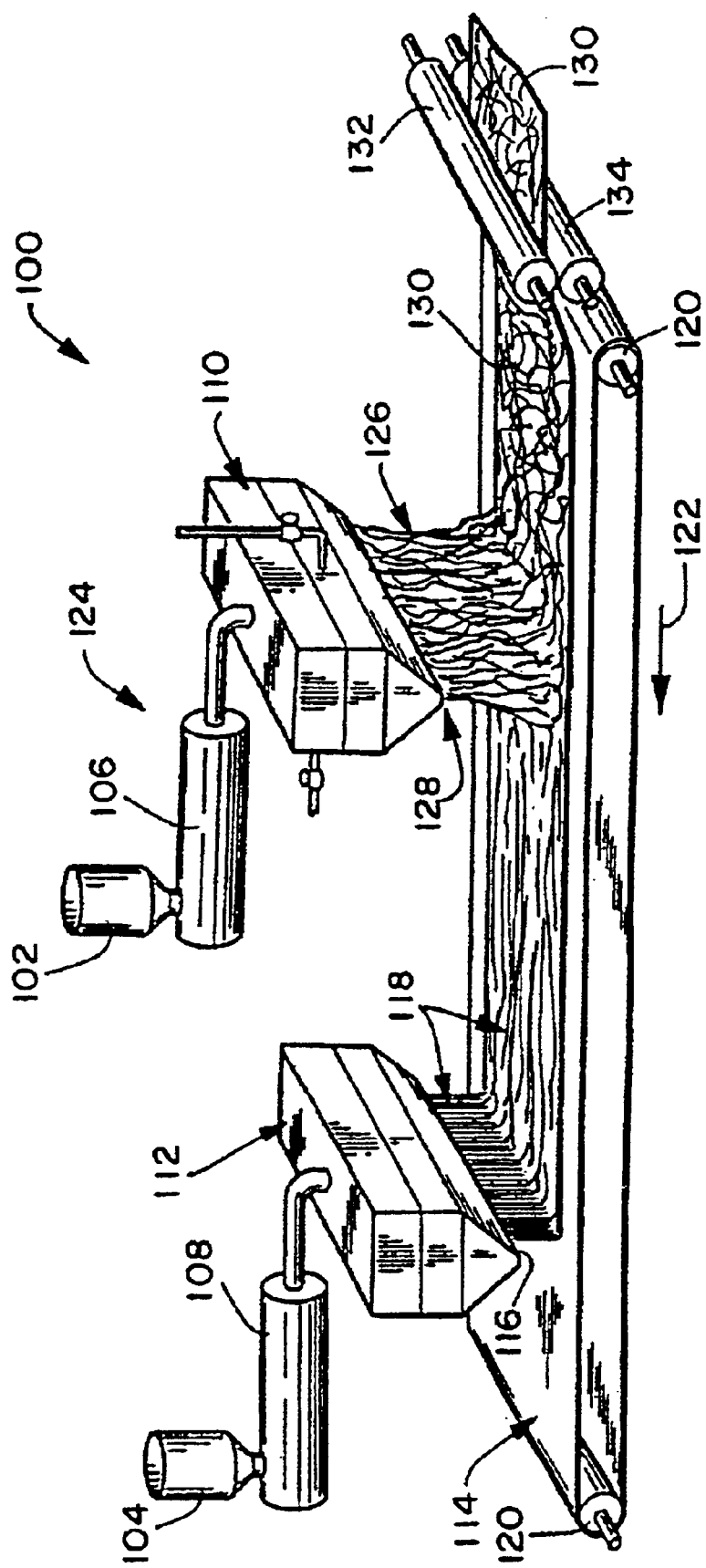
FIG. 2 is a schematic drawing of an exemplary process for forming an elastic fibrous web which is a component of the composite elastic material of the present invention.

FIG. 1 illustrates an embodiment of the present invention, an elastic fibrous web 12 prepared in a web forming machine 100, illustrated in detail in FIG. 2, which travels in the direction indicated by the arrow associated therewith. The elastic fibrous web layer 12 passes through an S-roll arrangement 16 before entering the horizontal calender, having a patterned calender roller 20 and an anvil roller 22. The calender roll can have from 1 to about 30% embossing pin bond area with the preferred area being from about 12 to about 14%. Both the anvil and pattern rollers can be heated to provide thermal point bonding as described above. The temperature and nip forces required to achieve adequate bonding are dependent on the material being laminated. It should be noted that the positions of the calender roller 20 and an anvil roller 22 in FIG. 1 are illustrative only and can be reversed.

A first gatherable layer 24 and a second gatherable layer 28 are prepared in the coform banks 2 and 4 (illustrated in detail in FIG. 3) and are guided and/or tensioned by rollers 9. FIG. 1 shows numerous rollers for guiding and/or tensioning the gatherable layers 24 or 28. For clarity of illustration not all rollers are labeled with reference number 9. It will be understood that all schematic depictions of rollers 9, circles in contact with a layer 24 or 28, as well as composite 40, in FIG. 1, are rollers 9. The gatherable layers 24 and 28 further pass through the horizontal calender 20, 22 with the elastic layer 12. The layers are bonded by the calender roller 20 and the anvil roller 22 to form composite 40. The gatherable layers can be formed using one or more sets of extruders for providing the microfibers. The microfibers can be formed by extrusion processes such as, for example, meltblowing processes or spunbonding.

The coherent integrated fibrous structure can be formed by the microfibers and wood pulp fibers without any adhesive, molecular or hydrogen bonds between the two different types of fibers. The absorbent fibers are preferably distributed uniformly throughout the matrix of microfibers to provide a homogeneous material. The material is formed by initially forming a primary air stream containing the melt blown microfibers, forming a secondary air stream containing the wood pulp fibers, merging the primary and secondary streams under turbulent conditions to form an integrated air stream containing a thorough mixture of the microfibers and wood pulp fibers, and then directing the integrated air stream onto a forming surface to air form the fabric-like material. The microfibers are in a soft nascent condition at an elevated temperature when they are turbulently mixed with the wood pulp fibers in air.

In one embodiment, the coform layer(s) can have from 20–50 wt. % of polymer fibers and 80–50 wt. % of pulp fibers. The preferred ratio of polymer fibers to pulp fibers can be from 25–40 wt. % of polymer fibers and 75–60 wt. % of pulp fibers. A more preferred ratio of polymer fibers to pulp fibers can be from 30–40 wt. % of polymer fibers and 70–60 wt. % of pulp fibers. The most preferred ratio of polymer fibers to pulp fibers can be from 35 wt. % of polymer fibers and 65 wt. % of pulp fibers.

Non-limiting examples of the polymers suitable for practicing the invention are polyolefin materials such as, for example, polyethylene, polypropylene and polybutylene, including ethylene copolymers, propylene copolymers and butylene copolymers thereof. A particularly useful polypropylene is Basell PF-105. Additional polymers are disclosed in U.S. Pat. No. 5,385,775.

Fibers of diverse natural origin are applicable to the invention. Digested cellulose fibers from softwood (derived from coniferous trees), hardwood (derived from deciduous trees) or cotton linters can be utilized. Fibers from Esparto grass, bagasse, kemp, flax, and other lignaceous and cellulose fiber sources may also be utilized as raw material in the invention. For reasons of cost, ease of manufacture and disposability, preferred fibers are those derived from wood pulp (i.e., cellulose fibers). A commercial example of such a wood pulp material is available from Weyerhaeuser as CF-405. Generally wood pulps can be utilized. Applicable wood pulps include chemical pulps, such as Kraft (i.e., sulfate) and sulfite pulps, as well as mechanical pulps including, for example, groundwood, thermomechanical pulp (i.e., TMP) and chemithermomechanical pulp (i.e., CTMP). Completely bleached, partially bleached and unbleached fibers are useful herein. It may frequently be desired to utilize bleached pulp for its superior brightness and consumer appeal.

Also useful in the present invention are fibers derived from recycled paper, which can contain any or all of the above categories as well as other non-fibrous materials such as fillers and adhesives used to facilitate the original paper making process.

The elastic fibrous web 12 passes through the S-rollers 16 in a reverse-S path, as viewed in FIG. 1. From the S-roll arrangement, the elastic fibrous web 12 passes through the pressure nip 32 formed in the horizontal calender 20, 22 by a bonding roller arrangement. Additional S-roll arrangements (not shown) can be introduced between the illustrated y S-roller arrangement and the calender roller arrangement to stabilize the stretched material and to control the amount of stretching. Because the peripheral linear speed of the rollers of the S-roll arrangement is controlled to be less than the peripheral linear speed of the rollers of the calender roller arrangement, the elastic fibrous web 12 is tensioned between the S-roll arrangement and the pressure nip 32 formed in the horizontal calender roller arrangement. The filaments of the elastic fibrous web 12 typically run along the direction that the web is stretched so that they can provide the desired stretch properties in the finished composite material. By adjusting the difference in the speeds of the rollers, the elastic fibrous web is tensioned so that stretches a desired amount and is maintained in a stretched condition while the gatherable layers 24 and 28 are joined to the elastic fibrous web 12 during their pass through the calender roller arrangement to form a composite elastic material 40. The elastic fibrous web can be stretched in the range of about 75% (i.e., a 1 cm length can be stretched to 1.75 cm) to about 300% (i.e., a 1 cm length can be stretched to 4 cm) of its relaxed length. Preferably the web can be stretched in the range of from about 75% to about 150% of its relaxed length. More preferably, the web can be stretched to from about 75% to about 100% of its relaxed length.

The composite elastic material 40 can be relaxed upon release of the tensioning force provided by the S-roll arrangement and the calender rollers. The gatherable layers are gathered in the composite elastic material 40. The composite elastic material 40 is then wound up on a winder roll 42. Optionally, the composite elastic material 40 is activated by heat treatment in a heat activation unit 44. Processes of making composite elastic materials of this type are described in, for example, U.S. Pat. No. 4,720,415 to Vander Wielen et al. and U.S. Pat. No. 5,385,775 to Wright. In an alternative embodiment the gatherable layer(s) 24 and 28 can be supplied from a supply roll(s) (not shown) in place of the coform banks 2 and 4. When a second gatherable layer 28 is employed, this would be supplied from another supply roll.

The gatherable layers 24 and 28 can be non-woven materials such as, for example, spunbonded webs, meltblown webs, air laid layer webs, bonded carded webs, hydroentangled webs, wet-formed webs or any combination thereof. In one embodiment of the present invention, one or both of the gatherable layers 24 and 28 is a multilayer material having, for example, at least one layer of spunbonded web joined to at least one layer of meltblown web, bonded carded web or other suitable material.

One or both of the gatherable layers 24 and 28 can be a composite material made of a mixture of two or more different fibers or a mixture of fibers and particulates. Such mixtures can be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, to Anderson et al.

A suitable material for practicing the present invention is a non-woven composite material commonly referred to as "coform." Coform is an air-formed matrix material of thermoplastic polymeric meltblown fibers such as, for example, microfibers having an average fiber diameter of less than about 10 microns, and a multiplicity of individualized absorbent fibers such as, for example, wood pulp fibers disposed throughout the matrix of polymer microfibers and engaging at least some of the microfibers to space the microfibers apart from each other. The absorbent fibers are interconnected by and held captive within the matrix of microfibers by mechanical entanglement of the microfibers with the absorbent fibers, the mechanical entanglement and interconnection of the microfibers and absorbent fibers alone forming a coherent integrated fibrous structure.

The coherent integrated fibrous structure can be formed by the microfibers and absorbent fibers without any adhesive, molecular or hydrogen bonds between the two different types of fibers. The absorbent fibers are preferably distributed uniformly throughout the matrix of microfibers to provide a homogeneous material. The material is formed by initially forming a primary air stream containing the melt blown microfibers, forming a secondary air stream containing the wood pulp fibers, merging the primary and secondary streams under turbulent conditions to form an integrated air stream containing a thorough mixture of the microfibers and wood pulp fibers, and then directing the integrated air stream onto a forming surface to air form the fabric-like material. The microfibers are in a soft nascent condition at an elevated temperature when they are turbulently mixed with the wood pulp fibers in air.

In one embodiment the gatherable layers 24 and 28 are coform layers having from 20–50 wt. % of polymer fibers and 80–50 wt. % of pulp fibers. The preferred ratio of polymer fibers to pulp fibers can be from 25–40 wt. % of polymer fibers and 75–60 wt. % of pulp fibers. A more preferred ratio of polymer fibers to pulp fibers can be from 30–40 wt. % of polymer fibers and 70–60 wt. % of pulp fibers. The most preferred ratio of polymer fibers to pulp fibers is from 35 wt. % of polymer fibers and 65 wt. % of pulp fibers.

One or both of the gatherable layers 24 and 28 can be made of pulp fibers, including wood pulp fibers, to form a material such as, for example, a tissue layer. Additionally, the gatherable layers can be layers of hydraulically entangled fibers such as, for example, hydraulically entangled mixtures of wood pulp and staple fibers such as disclosed in U.S. Pat. No. 4,781,966, to Taylor.

The gatherable layers 24 and 28 can be joined to the elastic fibrous web 12 at least at two places by any suitable means such as, for example, thermal bonding or ultrasonic welding which softens at least portions of at least one of the materials, usually the elastic fibrous web because the elastomeric materials used for forming the elastic fibrous web 12 have a lower softening point than the components of the gatherable layers 24 and 28. Joining can be produced by applying heat and/or pressure to the overlaid elastic fibrous web 12 and the gatherable layers 24 and 28 by heating these portions (or the overlaid layer) to at least the softening temperature of the material with the lowest softening temperature to form a reasonably strong and permanent bond between the re-solidified softened portions of the elastic fibrous web 12 and the gatherable layers 24 and 28.

The bonding roller arrangement 20, 22 includes a smooth anvil roller 22 and a patterned calendar roller 20, such as, for example, a pin embossing roller arranged with a smooth anvil roller. One or both of the smooth anvil roller and the calendar roller can be heated and the pressure between these two rollers can be adjusted by well-known structures to provide the desired temperature, if any, and bonding pressure to join the gatherable layers to the elastic fibrous web. As can be appreciated, the bonding between the gatherable layers and the elastic sheet is a point bonding. Various bonding patterns can be used, depending upon the desired tactile properties of the final composite laminate material. The bonding points are preferably evenly distributed over the bonding area of the composite material. One example of the bonding of the gatherable layer(s) and the elastic layer is explained below in conjunction with FIG. 10.

With regard to thermal bonding, one skilled in the art will appreciate that the temperature to which the materials, or at least the bond sites thereof, are heated for heat-bonding will depend not only on the temperature of the heated roller(s) or other heat sources but on the residence time of the materials on the heated surfaces, the compositions of the materials, the basis weights of the materials and their specific heats and thermal conductivities. Typically, the bonding can be conducted at a temperature of from about 40° to about 80° C. Preferably, the bonding can be conducted at a temperature of from about 55° to about 75° C. More preferably, the bonding can be conducted at a temperature of from about 60° to about 70° C. The typical pressure range, on the rollers, can be from about 18 to about 56.8 Kg per linear cm (KLC) The preferred pressure range, on the rollers, can be from about 18 to about 24 Kg per linear cm (KLC) However, for a given combination of materials, and in view of the herein contained disclosure the processing conditions necessary to achieve satisfactory bonding can be readily determined by one of skill in the art.

The elastic fibrous web 12 can also be preformed and unwound from a supply roll (not shown) and passed directly through the S-roll arrangement 16 before being bonded to a gatherable layer at nip 32. The gatherable layers 24 and 28 can be preformed and unwound from supply roll or rolls(not shown) and passed directly through the horizontal calender 20, 22.

Conventional drive means, e.g., electric motors, and other conventional devices which can be utilized in conjunction with the apparatus of FIG. 1 are well known and, for purposes of clarity, have not been illustrated in the schematic view of FIG. 1.

One component of the composite elastic material 40 is the elastic fibrous web 12. The elastic web can be a web comprising meltblown fibers or the web can contain two or more layers of materials; where at least one layer can be a layer of elastomeric meltblown fibers and at least one layer can contain substantially parallel rows of elastomeric fibers autogenously bonded to at least a portion of the elastomeric meltblown fibers. The elastomeric fibers can have an average diameter ranging from about 40 to about 750 microns and extend along length (ie. machine direction) of the fibrous web. The elastomeric fibers can have an average diameter in the range from about 50 to about 500 microns, for example, from about 100 to about 200 microns.

The elastic fibers extending along the length (i.e., MD) of the fibrous web increases the tensile modulus about 10% more than the tensile modulus of the fibrous web in the CD direction. For example, the tensile modulus of an elastic fibrous web can be about 20% to about 90% greater in the MD than the tensile modulus of a substantially isotropic non-woven web having about the same basis weight containing only elastomeric meltblown fibers. This increased MD tensile modulus increases the amount of retraction that can be obtained for a given basis weight of the composite elastic material.

The elastic fibrous web can contain at least about 20 percent, by weight, of elastomeric fibers. For example, the elastic fibrous web can contain from about 20 percent to about 100 percent, by weight, of the elastomeric fibers. Preferably, the elastomeric fibers can constitute from about 20 to about 60 percent, by weight, of the elastic fibrous web. More preferably, the elastomeric fibers can constitute from about 20 to about 40 percent, by weight, of the elastic fibrous web.

FIG. 2 is a schematic view of a system 100 for forming an elastic fibrous web which can be used as a component of the composite elastic material of the present invention. In forming the fibers which are used in the elastic fibrous web, pellets or chips, etc. (not shown) of an extrudable elastomeric polymer are introduced into pellet hoppers 102 and 104 of extruders 106 and 108.

Each extruder has an extrusion screw (not shown) which is driven by a conventional drive motor (not shown). As the polymer advances through the extruder, due to rotation of the extrusion screw by the drive motor, it is progressively heated to a molten state. Heating the polymer to the molten state can be accomplished in a plurality of discrete steps with its temperature being gradually elevated as it advances through discrete heating zones of the extruder 106 toward a meltblowing die 110 and extruder 108 toward a continuous filament forming unit 112. The meltblowing die 110 and the continuous filament forming unit 112 can be yet another heating zone where the temperature of the thermoplastic resin is maintained at an elevated level for extrusion. Heating of the various zones of the extruders 106 and 108 and the meltblowing die 110 and the continuous filament forming unit 112 can be achieved by any of a variety of conventional heating arrangements (not shown).

The elastomeric filament component of the elastic fibrous web can be formed utilizing a variety of extrusion techniques. For example, the elastic fibers can be formed utilizing one or more conventional meltblowing die units which have been modified to remove the heated gas stream (i.e., the primary air stream) which flows generally in the same direction as that of the extruded threads to attenuate the extruded threads. This modified meltblowing die unit 112 usually extends across a foraminous collecting surface 114 in a direction which is substantially transverse to the direction of movement of the collecting surface 114. The modified die unit 112 includes a linear array 116 of small diameter capillaries aligned along the transverse extent of the die with the transverse extent of the die being approximately as long as the desired width of the parallel rows of elastomeric fibers which is to be produced. That is, the transverse dimension of the die is the dimension which is defined by the linear array of die capillaries. Typically, the diameter of the capillaries can be on the order of from about 0.025 cm (0.01 in) to about 0.076 cm (0.03 in). Preferably, the diameter of the capillaries can be from about 0.0368 cm (0.0145 in) to about 0.0711 cm (0.028 in). More preferably, the diameter of the capillaries can be from about 0.06 cm (0.023 in) to about 0.07 cm (0.028 in). From about 5 to about 50 such capillaries can be provided per linear inch of die face. Typically, the length of the capillaries can be from about 0.127 cm (0.05 in) to about 0.508 cm (0.20 in). Typically, the length of the capillaries can be about 0.287 cm (0.113 in) to about 0.356 cm (0.14 in) long. A meltblowing die can extend from about 51 cm (20 in) to about 185 or more cm (about 72 in) in length in the transverse direction. One familiar with the art would realize that the capillaries could be a shape other than circular, such as, for example, triangular, rectangular, and the like; and that the spacing or density of the capillaries can vary across the length of the die.

Since the heated gas stream (i.e., the primary air stream) which flows past the die tip is greatly reduced or absent, it is desirable to insulate the die tip or provide heating elements to ensure that the extruded polymer remains molten and flowable while in the die tip. Polymer is extruded from the array 116 of capillaries in the modified die unit 112 to create extruded elastomeric fibers 118.

The extruded elastomeric fibers 118 have an initial velocity as they leave the array 116 of capillaries in the modified die unit 112. These fibers 118 are deposited upon a foraminous surface 114 which should be moving at least at the same velocity as the initial velocity of the elastic fibers 118. This foraminous surface 114 is an endless belt conventionally driven by rollers 120. The fibers 118 are deposited in substantially parallel alignment on the surface of the endless belt 114 which is rotating as indicated by the arrow 122 in FIG. 2. Vacuum boxes (not shown) can be used to assist in retention of the matrix on the surface of the belt 114. The tip of the die unit 112 is as close as practical to the surface of the foraminous belt 114 upon which the continuous elastic fibers 118 are collected. For example, this forming distance can be from about 2 inches to about 10 inches. Desirably, this distance is from about 2 inches to about 8 inches.

It may be desirable to have the foraminous surface 114 moving at a speed that is much greater than the initial velocity of the elastic fibers 118 in order to enhance the alignment of the fibers 118 into substantially parallel rows and/or elongate the fibers 118 so they achieve a desired diameter. For example, alignment of the elastomeric fibers 118 can be enhanced by having the foraminous surface 114 move at a velocity from about 2 to about 10 times greater than the initial velocity of the elastomeric fibers 118. Even greater speed differentials can be used if desired. While different factors can affect the particular choice of velocity for the foraminous surface 114, it will typically be from about four to about eight times faster than the initial velocity of the elastomeric fibers 118.

Desirably, the continuous elastomeric fibers are formed at a density per inch of width of material which corresponds generally to the density of capillaries on the die face. For example, the filament density per inch of width of material may range from about 10 to about 120 such fibers per inch width of material. Typically, lower densities of fibers (e.g., 10–35 fibers per inch of width) can be achieved with only one filament forming die. Higher densities (e.g., 35–120 fibers per inch of width) can be achieved with multiple banks of filament forming equipment.

The meltblown fiber component of the elastic fibrous web is formed utilizing a conventional meltblowing device 124. Meltblowing device 124 generally extrudes a thermoplastic polymer resin through a plurality of small diameter capillaries of a meltblowing die as molten threads into a heated gas stream (the primary air stream) which is flowing generally in the same direction as that of the extruded threads so that the extruded threads are attenuated, i.e., drawn or extended, to reduce their diameter. Such meltblowing techniques, and apparatus therefor, are discussed fully in U.S. Pat. No. 4,663,220 to Wisneski et al.

In the meltblown die arrangement 110, the position of air plates which, in conjunction with a die portion define chambers and gaps, can be adjusted relative to the die portion to increase or decrease the width of the attenuating gas passageways so that the volume of attenuating gas passing through the air passageways during a given time period can be varied without varying the velocity of the attenuating gas. Generally speaking, lower attenuating gas velocities and wider air passageway gaps are generally preferred if substantially continuous meltblown fibers or microfibers are to be produced.

The two streams of attenuating gas converge to form a stream of gas which entrains and attenuates the molten threads, as they exit the orifices, into fibers depending upon the degree of attenuation, microfibers, of a small diameter which is usually less than the diameter of the orifices. The gas-borne fibers or microfibers 126 are blown, by the action of the attenuating gas, onto a collecting arrangement which, in the embodiment illustrated in FIG. 2, is the foraminous endless belt 114 which carries the elastomeric filament in substantially parallel alignment. The fibers or microfibers 126 are collected as a coherent matrix of fibers on the surface of the elastomeric fibers 118 and foraminous endless belt 114, which is rotating clockwise as indicated by the arrow 122 in FIG. 2. If desired, the meltblown fibers or microfibers 126 can be collected on the foraminous endless belt 114 at numerous impingement angles. Vacuum boxes (not shown) can be used to assist in retention of the matrix on the surface of the belt 114. Typically the tip 128 of the die 110 is from about 6 inches to about 14 inches from the surface of the foraminous belt 114 upon which the fibers are collected. The entangled fibers or microfibers 124 autogenously bond to at least a portion of the elastic continuous fibers 118 because the fibers or microfibers 124 are still somewhat tacky or molten while they are deposited on the elastic continuous fibers 118, thereby forming the elastic fibrous web 130. The fibers are quenched by allowing them to cool to a temperature below about 38° C.

As discussed above, the elastomeric fibers and elastomeric meltblown fibers can be deposited upon a moving foraminous surface. In one embodiment of the invention, meltblown fibers can be formed directly on top of the extruded elastomeric fibers. This is achieved by passing the fibers and the foraminous surface under equipment which produces meltblown fibers. Alternatively, a layer of elastomeric meltblown fibers can be deposited on a foraminous surface and substantially parallel rows of elastomeric fibers can be formed directly upon the elastomeric meltblown fibers. Various combinations of filament forming and fiber forming equipment can be set up to produce different types of elastic fibrous webs. For example, the elastic fibrous web may contain alternating layers of elastomeric fibers and elastomeric meltblown fibers. Several dies for forming meltblown fibers or creating elastomeric fibers may also be arranged in series to provide superposed layers of fibers.

The elastomeric meltblown fibers and elastomeric fibers can be made from any material that can be manufactured into such fibers such as natural polymers or synthetic polymers. Generally, any suitable elastomeric fiber forming resins or blends containing the same can be utilized for the elastomeric meltblown fibers and any suitable elastomeric filament forming resins or blends containing the same can be utilized for the elastomeric fibers. The fibers can be formed from the same or different elastomeric resin.

For example, the elastomeric meltblown fibers and/or the elastomeric fibers can be made from block copolymers having the general formula A-B-A' where A and A' are each a thermoplastic polymer endblock which can contain a styrenic moiety such as a poly (vinyl arene) and where B is an elastomeric polymer midblock such as a conjugated diene or a lower alkene polymer. The block copolymers can be, for example, (polystyrene/poly(ethylene-butylene)/polystyrene) block copolymers available from the Shell Chemical Company under the trademark KRATON R™ G. One such block copolymer can be, for example, KRATON R™ G-1657.

Other exemplary elastomeric materials which can be used include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E.I. DuPont De Nemours & Company. Formation of elastomeric meltblown fibers from polyester elastic materials is disclosed in, for example, U.S. Pat. No. 4,741,949.

Useful elastomeric polymers also include, for example, elastic copolymers of ethylene and at least one vinyl monomer such as, for example, vinyl acetates, unsaturated aliphatic monocarboxylic acids, and esters of such monocarboxylic acids. The elastic copolymers and formation of elastomeric meltblown fibers from those elastic copolymers are disclosed in, for example, U.S. Pat. No. 4,803,117 to Daponte. Also, suitable elastomeric polymers are those prepared using metallocene catalysts such as those disclosed in International Application WO 00/48834.

Processing aids can be added to the elastomeric polymer. For example, a polyolefin can be blended with the elastomeric polymer (e.g., the A-B-A elastomeric block copolymer) to improve the processability of the composition. The polyolefin must be one which, when so blended and subjected to an appropriate combination elevated pressure and elevated temperature conditions, extrudable, in blended form, with the elastomeric polymer. Useful blending polyolefin materials include, for example, polyethylene, polypropylene and polybutylene, including ethylene copolymers, propylene copolymers and butylene copolymers. A particularly useful polyethylene can be obtained from the U.S.I. Chemical Company under the trade designation Betrothing NA 601 (also referred to herein as PE NA 601 or polyethylene NA 601). Two or more of the polyolefins can be utilized. Extrudable blends of elastomeric polymers and polyolefins are disclosed in, for example, previously referenced U.S. Pat. No. 4,663,220.

The elastomeric meltblown fibers and/or the elastomeric fibers can have some tackiness adhesiveness to enhance autogenous bonding. For example, the elastomeric polymer itself can be tacky when formed into fibers or, optionally, a compatible tackifying resin can be added to the extrudable elastomeric compositions described above to provide tackified elastomeric fibers and/or fibers that autogenously bond. In regard to the tackifying resins and tackified extrudable elastomeric compositions, note the resins and compositions as disclosed in U.S. Pat. No. 4,787,699, to Moulin.

Any tackifier resin can be used which is compatible with the elastomeric polymer and can withstand the high processing (e.g., extrusion) temperatures. If the elastomeric polymer (e.g., A-B-A elastomeric block copolymer) is blended with processing aids such as, for example, polyolefins or extending oils, the tackifier resin should also be compatible with those processing aids. Generally, hydrogenated hydrocarbon resins are preferred tackifying resins, because of their better temperature stability. Composite elastic material REGALREZ™ and ARKON™ series tackifiers are examples of hydrogenated hydrocarbon resins. ZONATAKT™501 Lite is an example of a terpene hydrocarbon. REGALREZ™ hydrocarbon resins are available from Hercules incorporated. ARKON™ series resins are available from Arakawa Chemical (U.S.A.) Inc. The present invention is not limited to use of these tackifying resins, and other tackifying resins which are compatible with the other components of the composition and can withstand the high processing temperatures, can also be used.

Typically, the blend used to form the elastomeric fibers include, for example, from about 40 to about 95 percent by weight elastomeric polymer, from about 5 to about 40 percent polyolefin and from about 5 to about 40 percent resin tackifier. For example, a particularly useful composition included, by weight, about 61 to about 65 percent KRATON™ G-1657, about 17 to about 23 percent polyethylene polymer, and about 15 to about 20 percent Composite elastic material REGALREZ™ 1126. The preferred polymers are metallocene catalyzed polyethylene polymers, such as, for example Affinity® polymers, available from Dow® Chemical Company as Affinity XUS59400.03L.

The elastomeric meltblown fiber component of the present invention can be a mixture of elastic and non-elastic fibers or particulates. For example, such a mixture, is disclosed in U.S. Pat. No. 4,209,563 to Sisson, where elastomeric and non-elastomeric fibers are commingled to form a single coherent web of randomly dispersed fibers. Another example of such an elastic composite web could be made by a technique disclosed in previously cited U.S. Pat. No. 4,741,949 to Morman et al. This patent discloses an elastic non-woven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, activated charcoal, clays, starches, or hydrocolloid (hydrogel) particulates commonly referred to as super-absorbents occurs prior to collection of the fibers upon a collecting device to form a coherent web of randomly dispersed fibers.

Figure 3:
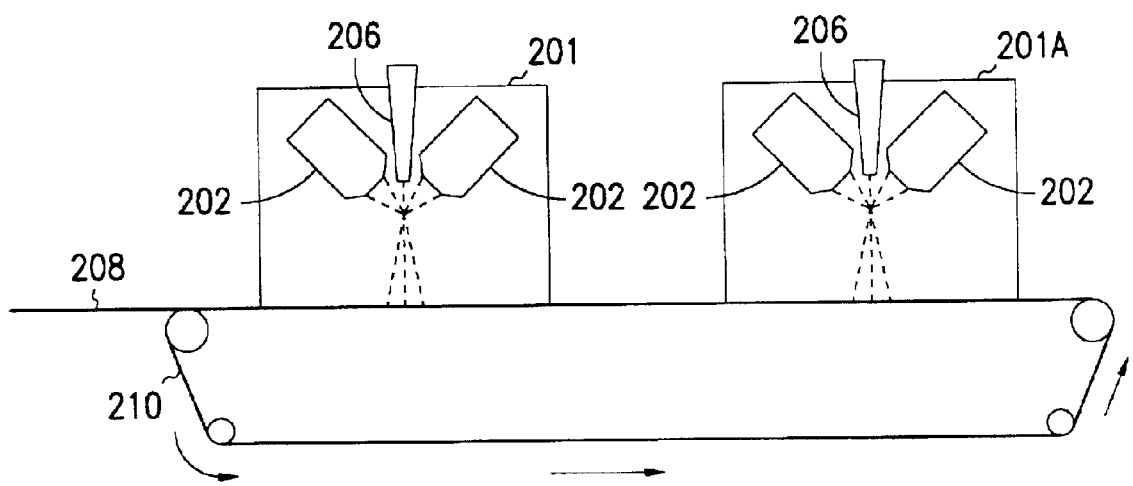
FIG. 3 is a schematic drawing of an exemplary process for preparing a gatherable layer such as coform.
Figure 3A:
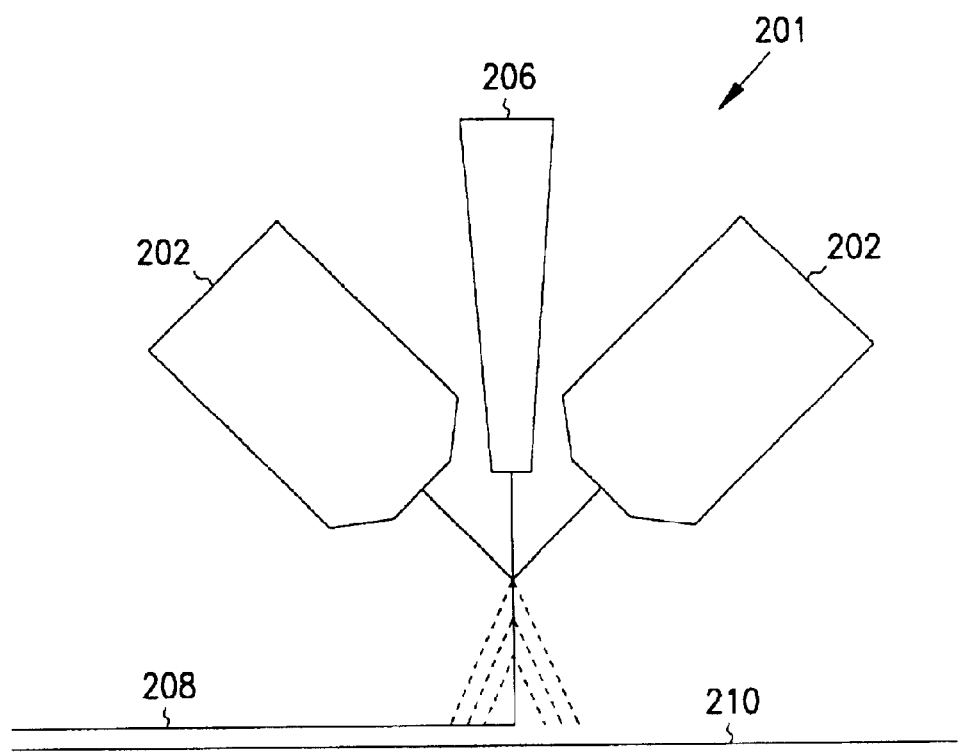

FIG. 3 is a schematic view of an exemplary process for forming a gatherable web, such as coform, which can be used as a component of the composite elastic material of the invention. The matrix material comprising thermoplastic polymer microfibers from the extruder banks 201 and 201A (201A is an optional additional extruder bank) of the meltblowing extruders 202, are blended with the individualized absorbent fibers from the pulp generator 206. The nonwoven web 208 is carried along the forming wire 210 to the calender or wound on a roll.

If desired, the composite elastic material of the invention can be heat activated. Heat activation can provide dimensional stability in the web by increasing the retraction that occurs in the manufacturing process. Elevating the temperature of the web and imparting energy to the elastomer can cause it to retract beyond the range achievable at ambient conditions. There are numerous heat activation methods including, but not limited to, through-air heating, surface heating, infrared, microwave, and liquid transfer. The heat activation step can also be executed in multiple locations such as the in-line manufacturing process, after material winding, or during converting. In-line through-air heat activation is the method illustrated because it provides good heat transfer.

Figure 4:
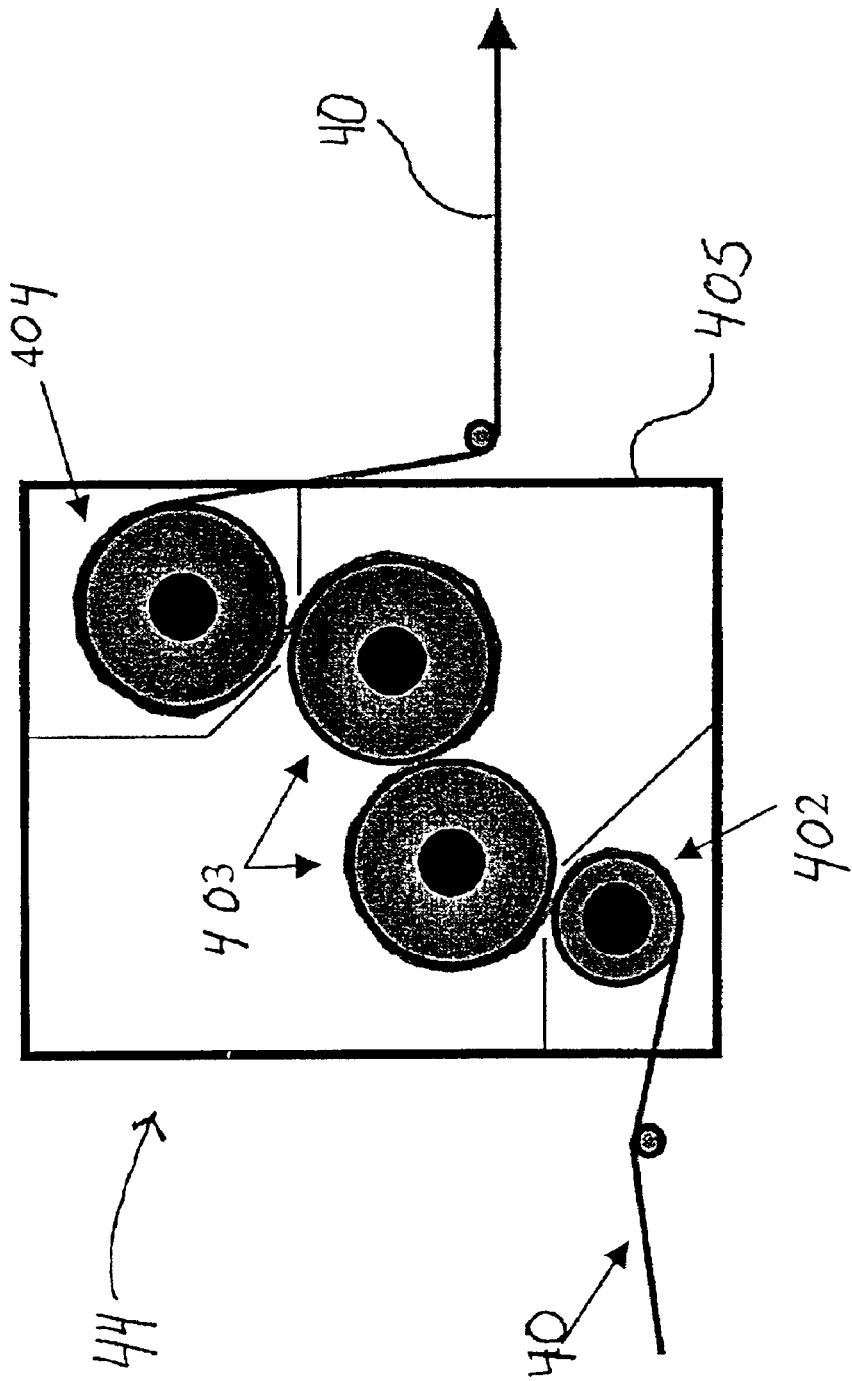
FIG. 4 is a schematic drawing of an exemplary process for the heat treatment of the composite elastic material of the present invention activated by treatment in a heat activator.

In the embodiment of this invention illustrated in FIG. 4, the composite elastic web is allowed to retract as much as possible at ambient temperatures and fed into the heat activation unit 44. The web is stretched, heated to about 57° C. and allowed to retract. This retraction occurs after the web travels from a vacuum drum in the heating section to a vacuum drum in the quenching section. After this additional retraction has occurred the web is cooled on the quench vacuum roll(s) to preserve this retracted state as the web is processed further.

FIG. 4 is a schematic view of an exemplary process of a heat activation unit 44. The composite elastic material 40 of the invention can be fed into the heat activation unit 44. The transfer roller 402 feeds web into heat activation unit. The vacuum rolls 403 (two shown) provide the necessary residence time for heat activation to occur. Heated air is supplied to the chamber 405 containing the vacuum rolls and evacuated through the center of the vacuum rolls. If multiple rollers are employed they can be operated at the same speed or at different speeds. One or more vacuum rollers 404 is provided to allow residence time in the quenching/cooling chamber 406 to reduce the fabric temperature to ambient conditions. If multiple rollers are employed they can be operated at the same speed or at different speeds. The quenching vacuum roller(s) can be run at a slower speed than the vacuum roller(s) in the heating section to allow retraction to occur prior to cooling the web. The quenching roll/rolls can run from about 6 to about 10% slower than the rolls in the heating section.

Figure 5:
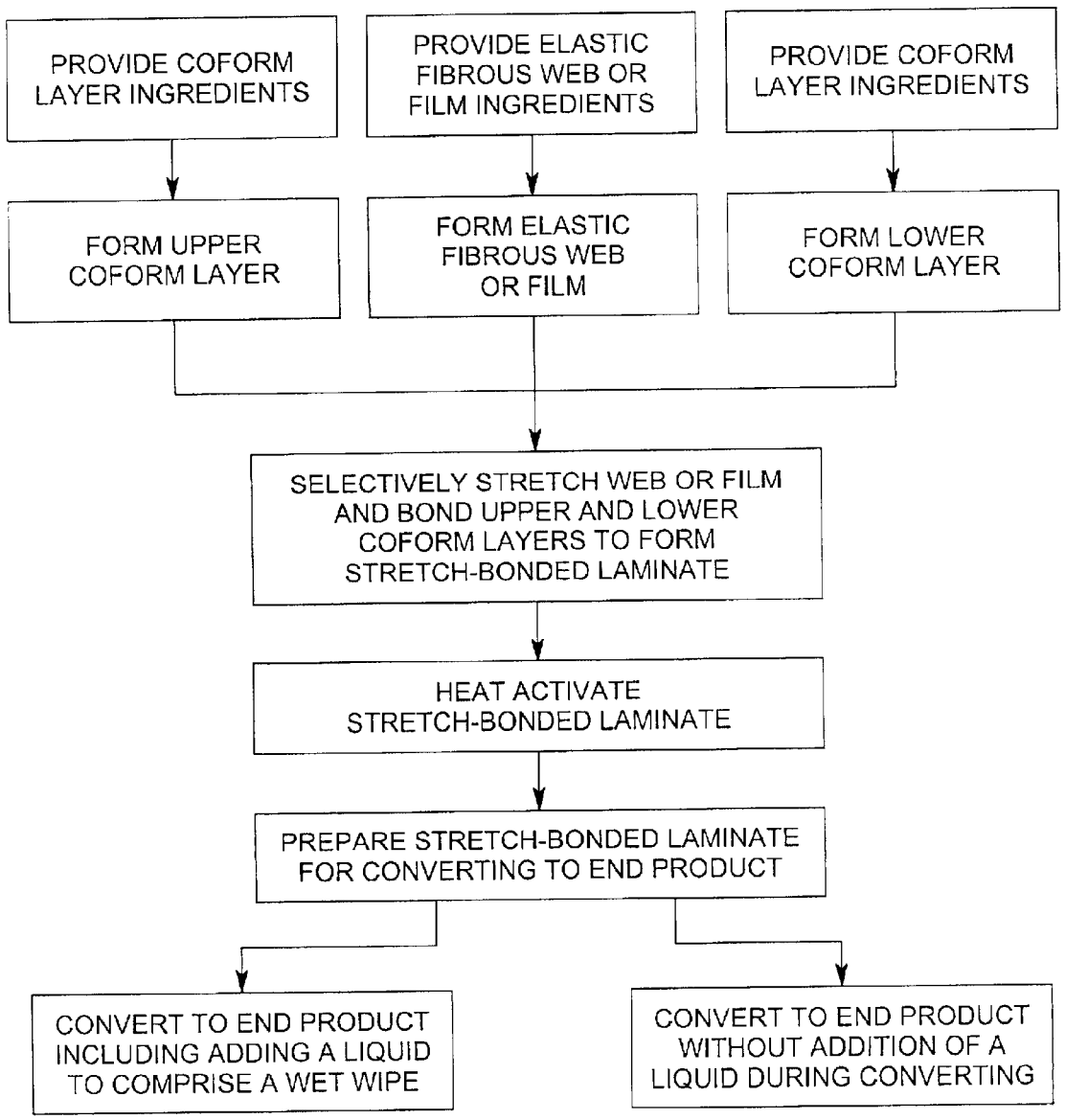
FIG. 5 is a schematic illustration of the process for the preparation of the composite elastic material of the present invention.

FIG. 5 shows a flowchart representing steps for producing a composite or laminate according to the present invention. It is believed that these steps are described herein and further description in not necessary.

The laboratory conditions under which testing was performed generally adhere to ASTM E 171, "Standard Atmospheres for Conditioning and Testing Materials", as well as 21 CFR 58.61–63, "Good laboratory practices for nonclinical laboratory studies" and CFR 211.160(b)(4), "Current Good Manufacturing Practices for Finished Pharmaceuticals".

Figure 10:
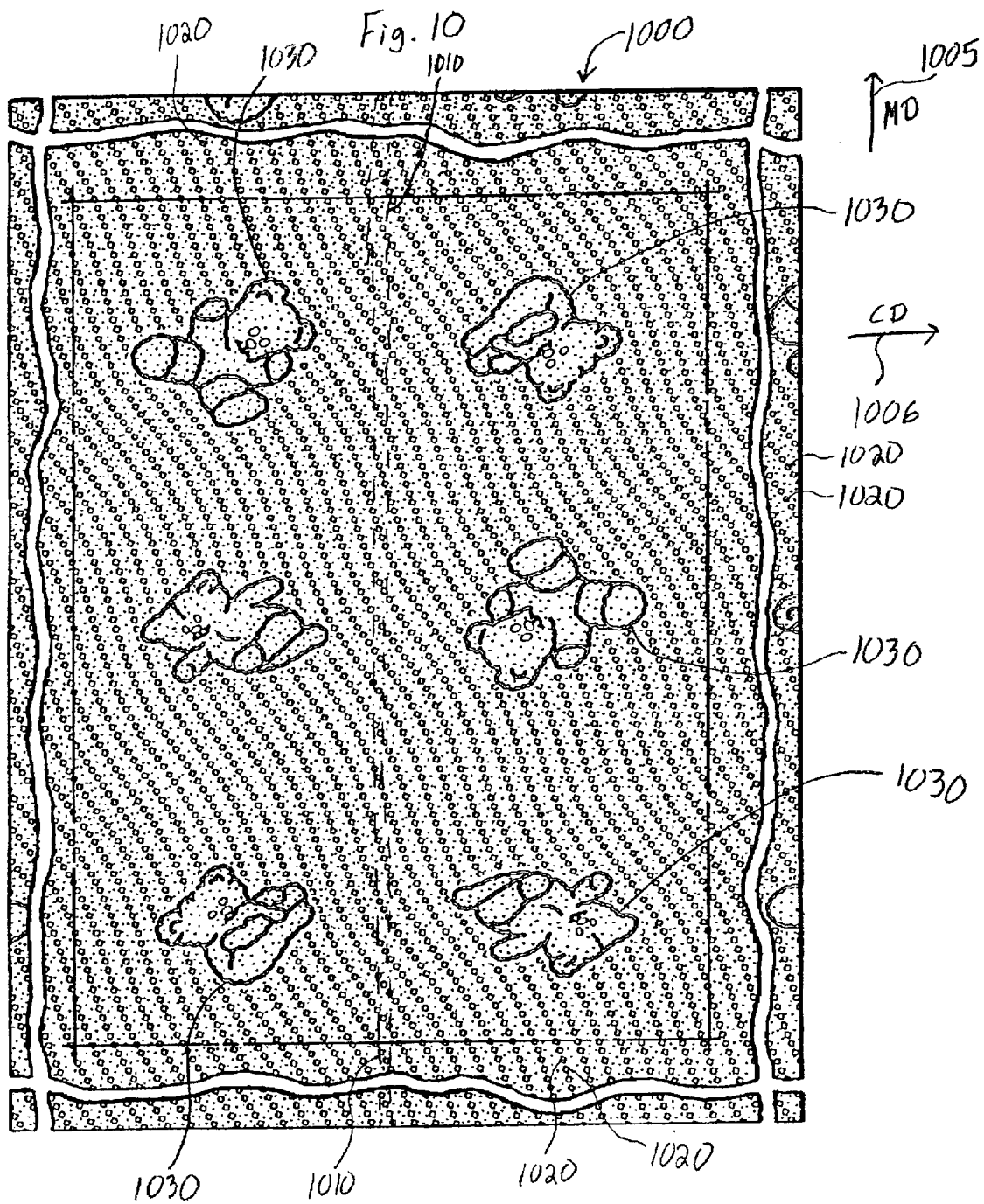
FIG. 10 is a representative plan view of an bonding pattern suitable for bonding the layers of the composite elastic material.
Figure 11:
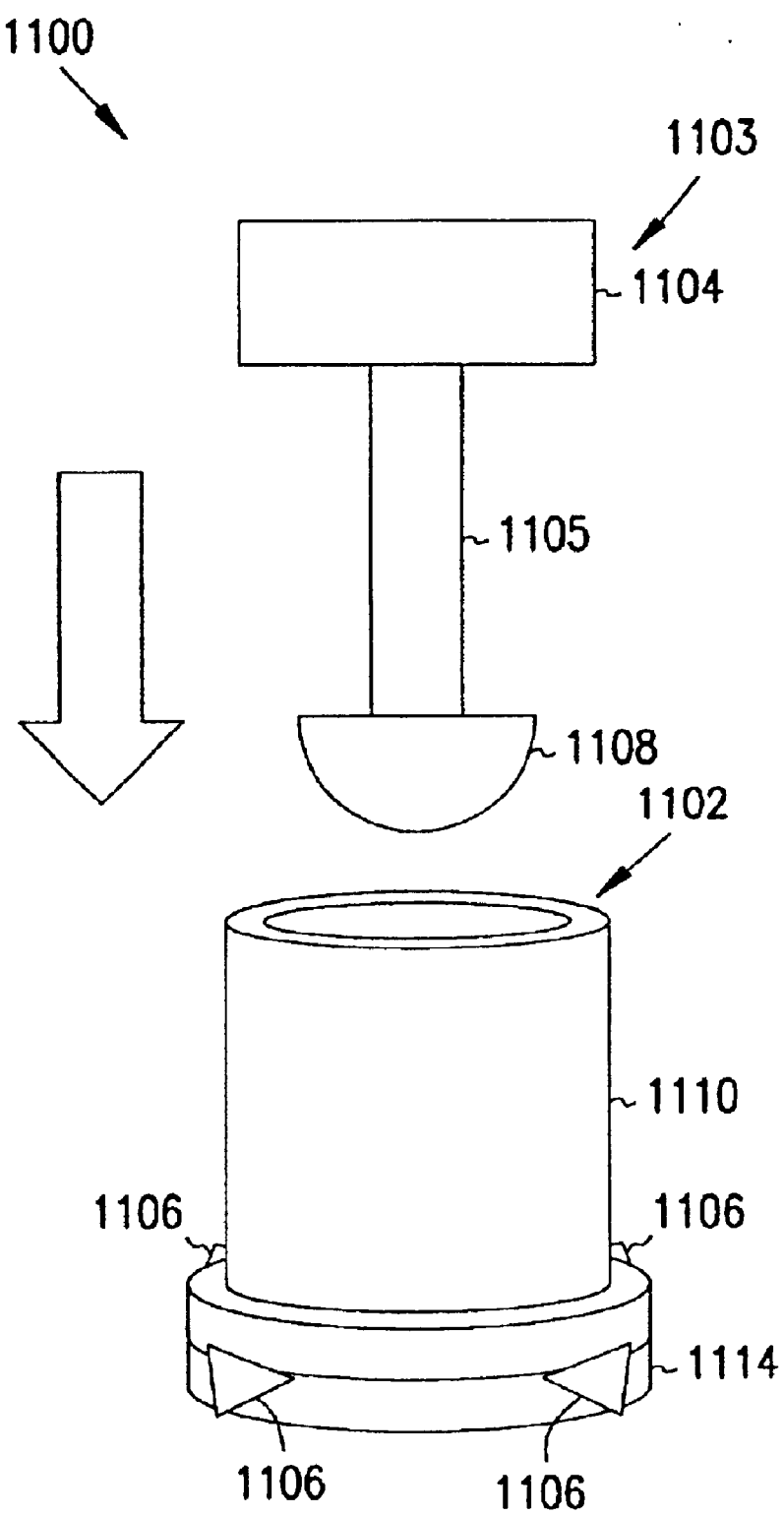
FIG. 11 is a schematic view of a load testing apparatus for testing a composite according to the present invention.
Figure 12:
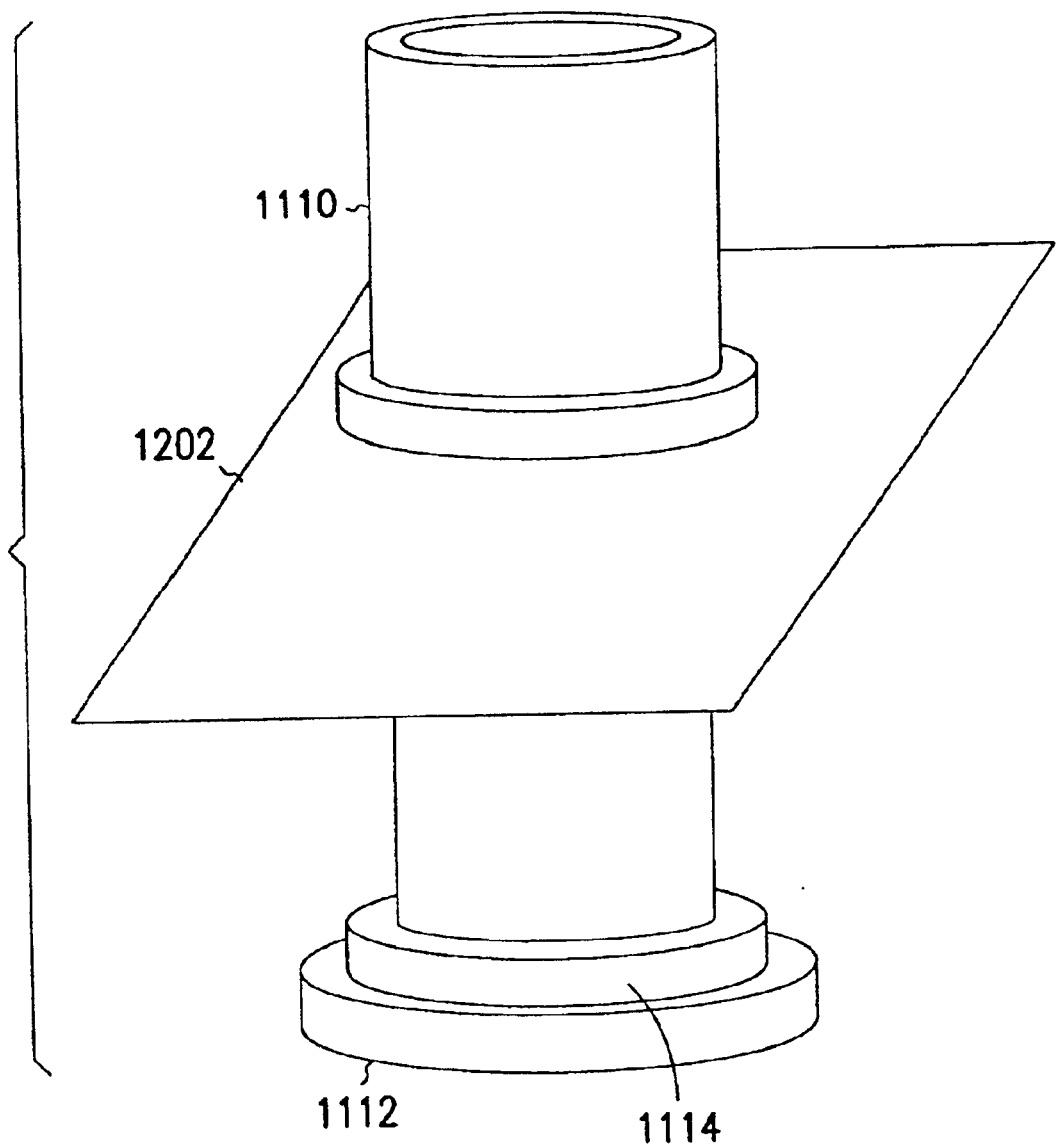
FIG. 12 is an exploded view of FIG. 11.

FIGS. 11 and 12 show a cup-crush testing system 1100 which includes a cup forming assembly 1102 and force testing unit 1103. The force testing unit 1103 includes a force sensor 1104 to which is cantilevered a rigid rod 1105. A hemispherical foot 1108 is positioned at the free end of rod 1105. Force sensor 1104 includes electronics and mechanics for measuring the force experienced at foot 1108 and transferred through rigid rod 1105. The assembly 1102 includes mating, top-hat shaped former cups 1110 and 1112, which grip a sheet 1202 (such as wet-wipe 1000, see FIG. 10), at at least four points. The four corners 1106 of sheet 1202 extend outside of the assembly 1102. The cup 1112 is removed after forming sheet 1202 into a cup. A gripping ring 1114 holds the formed sheet 1202 in cup 1110 during testing.

One measure of the softness of a non-woven fabric sheet 1202 is determined according to the "cup crush" test by system 1100. The cup crush test evaluates fabric stiffness by measuring the peak load (also called the "cup crush load" or just "cup crush") required for a 4.5 cm diameter hemispherically shaped foot 1108 to crush a 17.8 cm by 17.8 cm piece of fabric 1202 shaped into an approximately 6.5 cm diameter by 6.5 cm tall cup shape, while the now cup shaped fabric is surrounded by an approximately 6.5 cm diameter cylinder cup 1110 to maintain a uniform deformation of the cup shaped fabric 1102. There can be gaps between the ring 1114 and forming cup 1110, but at least four corners 1106 must be fixedly pinched therebetween. The foot 1108 and cylinder cup 1110 are aligned to avoid contract between the cup walls and the foot that could affect the readings. The load is measured in grams, and recorded a minimum of twenty times per second while the foot is descending at a rate of about 406 mm per minute. The cup crush test provides a value for the total energy required to crush a sample (the "cup crush energy") which is the energy over a 4.5 cm range beginning 0.5 cm below the top of the fabric cup, i.e., the area under the curve formed by the load in grams on one axis and the distance the foot travels in millimeters on the other. Cup crush energy is reported in gm-mm (or inch-pounds). A lower cup crush value indicates a softer material. A suitable device for measuring cup crush is a model FTD-G-500 load cell (500 gram range) available from the Schaevitz Company, Pennsauken, N.J.

The peak load tensile test is a measure of breaking strength and elongation or strain of a fabric when subjected to unidirectional stress. This test is known in the art and is similar to ASTM-1117-80, section seven, which uses a 12-inch per minute strain rate. The results are expressed in grams to break and percent stretch before breakage. Higher numbers indicate a stronger, more stretchable fabric. The term "load" means the maximum load or force, expressed in units of weight, required to break or rupture the specimen in a tensile test. The term "strain" or "total energy" means the total energy under a load versus elongation curve as expressed in weight-length units. The term "elongation" means the increase in length of a specimen during a tensile test and is given in percent. Values for tensile strength and elongation are obtained using a specified width of fabric, in this case 1 inch (25.4 mm), clamp width and a constant rate of extension. The test is conducted using wet product as would be representative of consumer use. Fabric testing can be conducted in both the machine direction (MD) and cross-machine direction (CD) which can be determined by one familiar with non-woven materials by the orientation of the fibers. It is important that the samples be either parallel or perpendicular to the machine direction to insure accuracy. The test is conducted using a 2 inch (50.8 mm) wide clamp with one smooth face and one 0.25 inch round horizontal rod comprising each clamp mechanism. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phil., Pa. 19154, which have 3 inch (76 mm) long parallel clamps. This closely simulates fabric stress conditions in actual use.

The caliper of the composite elastic materials of the invention is a measure of thickness. The thickness is measured at 0.05 psi with a Starret-type bulk tester, in units of millimeters using a 7.62 cm (3 in) diameter platen. This test is conducted on the finished wet-wipe product and care must be taken to insure the platen does not fall on a fold or wrinkle that has resulted from packaging.

The density of the wet-wipe, as used herein is a "wet-density" calculated and is calculated as the basis weight divided by the caliper (measured wet). The wet thickness is employed so as to represent the product as obtained by a consumer. The commercially available wet-wipes that were used for comparison testing are usually only available in the form of a wet finished product. Dry basis weight is used to accurately assess the wet-density by elimination of variability caused by the amount of solution on the various brands of wet-wipes.

The wet-wipes are removed from their container and randomly selected. Each wipe is unfolded, numbered and measured (length and width). The wipes are stacked and compressed to about 15–20 metric tons in a press for about 10 seconds. This step is repeated until a steady stream of solution is no longer observed. The wipes are draped over a rod and placed in a drying oven at 105 ±2° C. for about 2 hours. The dry wipes are allowed to cool for about 14–15 minutes and weighed to ±0.01 g.

The invention will now be illustrated by the following non-limiting Examples.

EXAMPLE 1

Wet wipes were made as described in the present application. Each wet wipe contained a three-layer laminate composite elastic material, which included two gatherable outside coform layers and in inner elastomeric core.

Elastomeric Core

The elastomeric layer in this example is produced using a two bank meltblown process and a single continuous speed foraminous belt. The first bank of the meltblown process was setup to extrude elastomeric filaments/fibers directly onto the foraminous belt in a substantially parallel configuration without the use of heated primary air to draw the filaments. A metallocene-catalyzed polyethylene resin available from DOW Chemical Company, under the trade designation of Dow Affinity® XUS59400.03L, were used to produce the fibers at a nominal melt temperature of 220° C. The substantially parallel fibers were extruded through a spin beam with a nominal hole size of 0.07 cm and a density of 7 holes per cm. The velocity of the polymer through the spin beam and speed of the foraminous belt were adjusted to produce a web of fibers with a basis weight of 21 grams per square meter. The fiber web basis weight, the density of the capillaries in the spin beam, and the capillary size dictates the drawing ratio of the elastomeric filaments.

In the second bank in the meltblown process operates as a conventional meltblown head. The molten thermoplastic is extruded through fine die capillaries converging into a hot air stream, which attenuates the filaments of molten material reducing their diameter. The high velocity air stream carries these meltblown fibers to the constant speed foraminous surface. Such a process is disclosed for example in U.S. Pat. No. 3,849,241 to Butin. The meltblown head used here utilizes 0.0368 cm diameter capillaries at a density of 12 capillaries per cm, and operates at a melt temperature of 250° C. The elastomeric polymer used to produce the meltblown fibers is a dry blended resin in the following proportions: 80% Dow Affinity® XUS59400.03L, 15% Regalrez 1126, and 5% Dow 6806. As the meltblown fibers are deposited on the foraminous surface carrying the previously formed, substantially parallel, filament autogeneous bonding occurs and discrete points where the still molten fibers cross over the filaments. The basis weight of the web prepared is about 9 grams per square meter.

The web is then cooled to a temperature less than about 35° C. by drawing ambient air through the foraminous belt as the web travels over a vacuum box. This cooling is required prior to removing the web from the foraminous surface.

Stretching

The web is transported to an S-wrap roll arrangement by a series of idler rollers. The S-wrap rollers are driven to control their speed, and this combined with the large surface contact serve as a nip. The speed of the foraminous meltblown forming belt and S-wrap rollers travel at about the same speed and this speed is 50% of the speed of the calender rolls. This speed difference results in a 100% elongation of the elastic web between the S-wrap rolls and the calender roll. This stretching effect reduces the basis weight by about 50% and imparts significant stored energy to the elastomeric web as it is presented to be joined with the gatherable layers.

Gatherable Coform Layers

The gatherable coform layers were comprised of intermingled polypropylene meltblown fibers and fiberized softwood pulp. The polypropylene comprised 35 weight percent of the gatherable layer with the softwood pulp comprising the remaining 65 weight percent. Each coform layer is an air formed matrix produced utilizing a coform process with two forming stations. At each forming station an air stream containing fiberized softwood pulp (available under the trade designation CF-405 from Weyerhaeuser Corporation) is merged with two heated primary air streams containing polypropylene (available from BASELL under the trade designation PF-105) meltblown fibers. The two polypropylene meltblown streams oppose each other at an angle of 90 degrees and the pulp air stream is contained between these streams at an angle of 45 degrees to each. The air streams merge under turbulent conditions at a distance of approximately 20 cm above a constant speed foraminous surface. This first coform layer then travels on the foraminous surface under a second forming station producing a second layer of equal portions and basis weight. The second coform layer is bonded through mechanical entanglement to the first layer by virtue of the high velocity forming air common to coform processes. The second gatherable layer is formed in a similar fashion to the first.

The first and second gatherable layers are formed simultaneously by different forming stations on separate foraminous belting surfaces, which rotate in opposite directions conveying the coform layers toward each other. The coform layers are then removed from the foraminous surfaces and conveyed by conventional means to the vertical calender.

Combining

After leaving the foraminous surfaces the first and second gatherable layers enter the vertical embossing calender from opposite directions as shown in FIG. 1. (Alternatively, the gatherable layers could be traveling from a foraminous surface in the same direction into a calender, and in yet in another embodiment these gatherable layers can be transferred from a wound roll rather than foraminous surface.)

The elastomeric web enters the calender between the two gatherable layers in an elongated state (about twice the formed length, or 100% elongation), and could come from a separate foraminous surface as it does in the example, or from a wound roll. The smooth anvil roll and patterned calender roll bond the layers together at a plurality of discrete points in the configuration shown in FIG. 10. The heated bond rolls and high pressure cause additional mechanical entanglement and thermal bonding of the polymers in the fabric. A temperature of 65° C. and an embossing pressure of 21 kg per linear centimeter are used here.

Retracting

As the composite web leaves the calender the stored energy in the elastomer is released as the web is conveyed at a decreasing linear speed through the process and the elastomeric core gathers the exterior layers. With the components described the retraction occurs over a period of about 4 seconds and dictates an appropriate free web span for the given calender roll speed. For example if the calender roll has a linear speed of 5 meters per second then the web must be free to retract and decelerate over a distance of 20 meters. The exemplary composite web described herein retracts about 25% during this gathering step. This results in an increase in the basis weight of the web, corresponding to about 25%.

Heat Activation

In order to obtain further retraction and increase the dimensional stability of the composite it is transferred to a foraminous drum where it is held at a fixed dimension by vacuum. While held on the rotating, foraminous drum, or similar surface, the temperature of the web is elevated near the glass transition temperature of the elastomeric center layer by drawing a heated air stream through the web. Monitoring the temperature of the elastomeric portion of the composite is not possible as it is located between the gatherable layers and therefore the temperature of the external gatherable layers is used to monitor the process and is measured as it exits transitions off the foraminous drum. This is a reasonable approximation as the heat transfer with the through-air process. The external web temperature required for this example is about 55° C. Once heated the web is transferred to another vacuum drum, or similar surface, through space. This second drum is traveling slower than the heated drum (approximately 5% for this example) and additional retraction occurs between the two surfaces. Again an increase in basis weight of the web occurs. The second drum draws ambient air through the web reducing the temperature back to ambient following this retraction step.

The fabric can then be converted into individual wet wipes using numerous cutting, folding, wetting, and stacking methods known in the art. The wet wipes included a solution similar to that currently being used with Kleenex® Huggies® Supreme Care Scented baby wipes, which were commercially available from Kimberly-Clark Corporation, a business having offices located in Neenah, Wis. The wet wipes included about 330 weight percent of the solution based on the dry weight of the wipe.

EXAMPLE 2

Following the procedure of Example 1, a composite elastic material is prepared using an elastomeric web containing 100% elastomeric meltblown fibers at a basis weight of 25 grams per square meter.

EXAMPLE 3

A particularly suitable solution for the wet wipes of the present invention was prepared according to the following formulation:

| Ingredient CTFA Designation | wt. % |
| --- | --- |
| Water | 98.52 |
| Potassium Laureth mono alkyl phosphate | 0.6 |
| Glycerin | 0.29 |
| Polysorbate-20 | 0.30 |
| Sodium hydroxymethylglycinate | 0.20 |
| Propylparaben | 0.1 |
| Fragrance | 0.05 |

The potassium laureth mono alkyl phosphate was commercially available from Rhone-Poulenc under the trade designation RHODAFAC. The Polysorbate-20 was commercially available from Rhone Poulenc under the trade designation ALKAMULS PSML-20. The sodium hydroxymethylglycinate was commercially available from Sutton Labs, a business having offices located in Catham, N.J., under the trade designation SUTTOCIDE A. Malic acid was then added to the solution to bring the pH level to 5.5. The solution exhibited a silky, lubricious feel and was relatively nonirritating to the skin.

EXAMPLE 4

A suitable solution for the wet wipes of the present invention was prepared according to the following formulation:

| Ingredient CTFA Designation | wt. % |
|---|---|
| Water | 97.02 |
| Potassium Coco mono alkyl phosphate | 0.4 |
| Propylene Glycol | 0.5 |
| Polysorbate-20 | 0.30 |
| Sodium hydroxymethylglycinate | 0.15 |
| Fragrance | 0.03 |

The potassium coco mono alkyl phosphate was commercially available from Rhone-Poulenc under the trade designation RHODAFAC. The Polysorbate-20 was commercially available from Rhone-Poulenc under the trade designation ALKAMULS PSML-20. The sodium hydroxymethylglycinate was commercially available from Sutton Labs, a business having offices located in Chatham, N.J., under the trade designation SUTTOCIDE A. Malic acid was then added to the solution to bring the pH level to 5.5. The solution was cloudy, exhibited a slight silky after feel and precipitated.

EXAMPLE 5

Composite elastic materials, prepared according to Example 1, were formed into sheets and moistened, using a solution prepared according to Example 3, to provide wet-wipes. These wet-wipes were compared to commercially available wet-wipes obtained from about September 1996 through January 2000 as recited in Table I.

Figure 6:
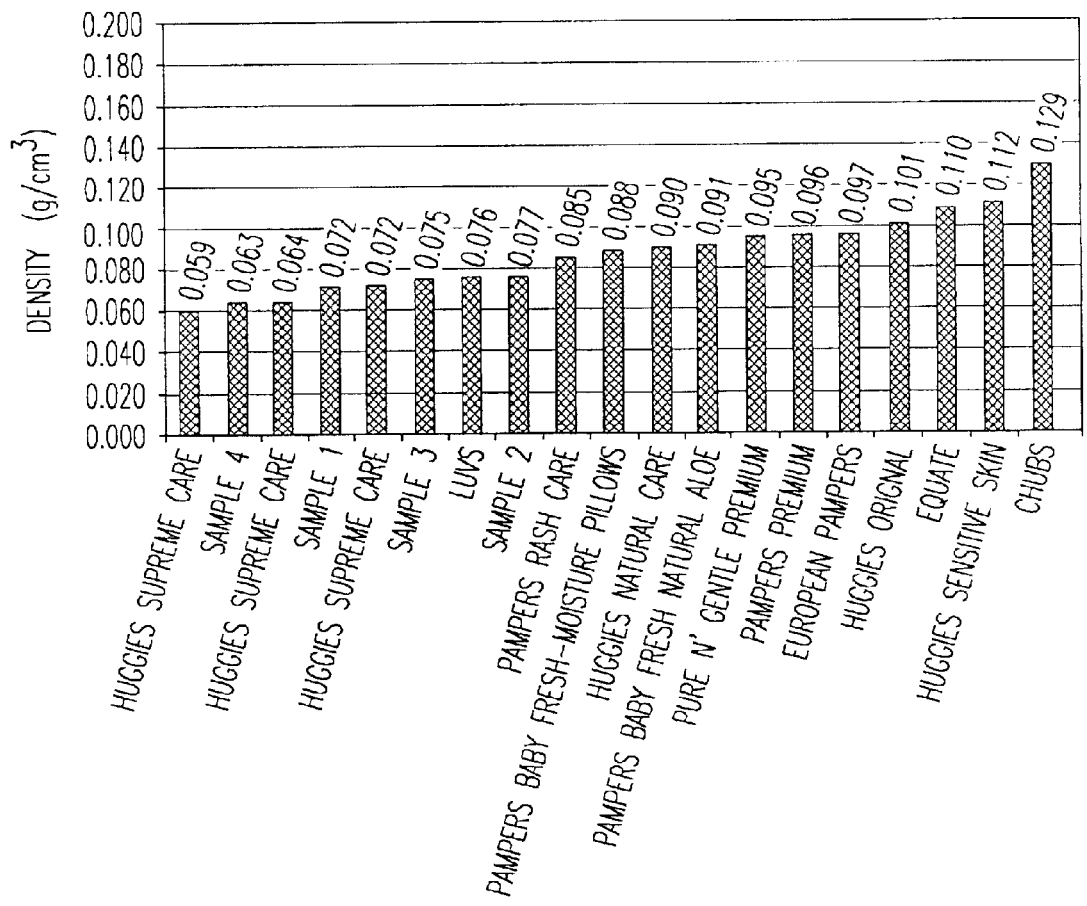
FIG. 6 is a graphic illustration of the wet density of several commercially available wet-wipes and the wet density of the wet-wipes of the present invention.
Figure 7:
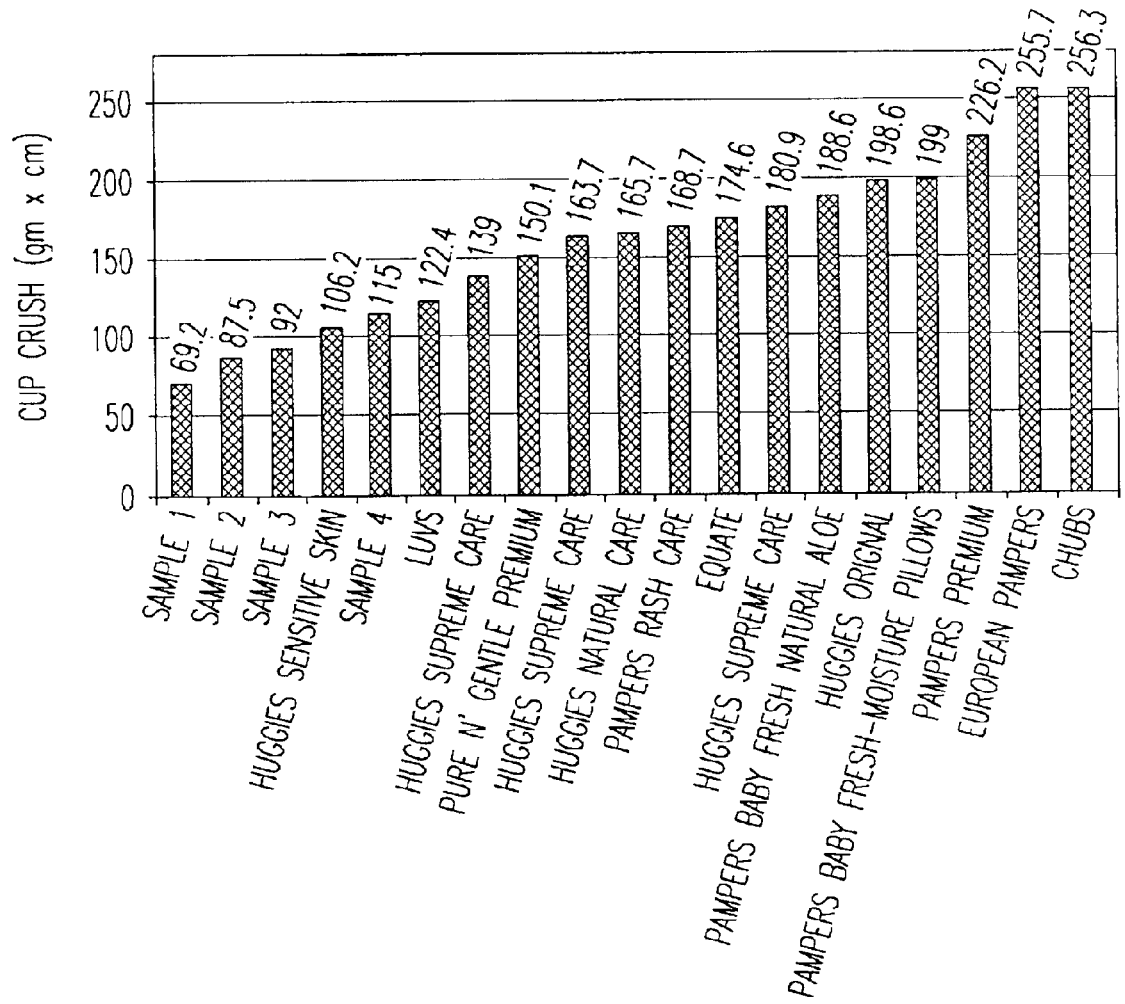
FIG. 7 is a graphic illustration of the cup crush of several commercially available wet-wipes and the cup crush of the wet-wipes of the present invention.
Figure 8:
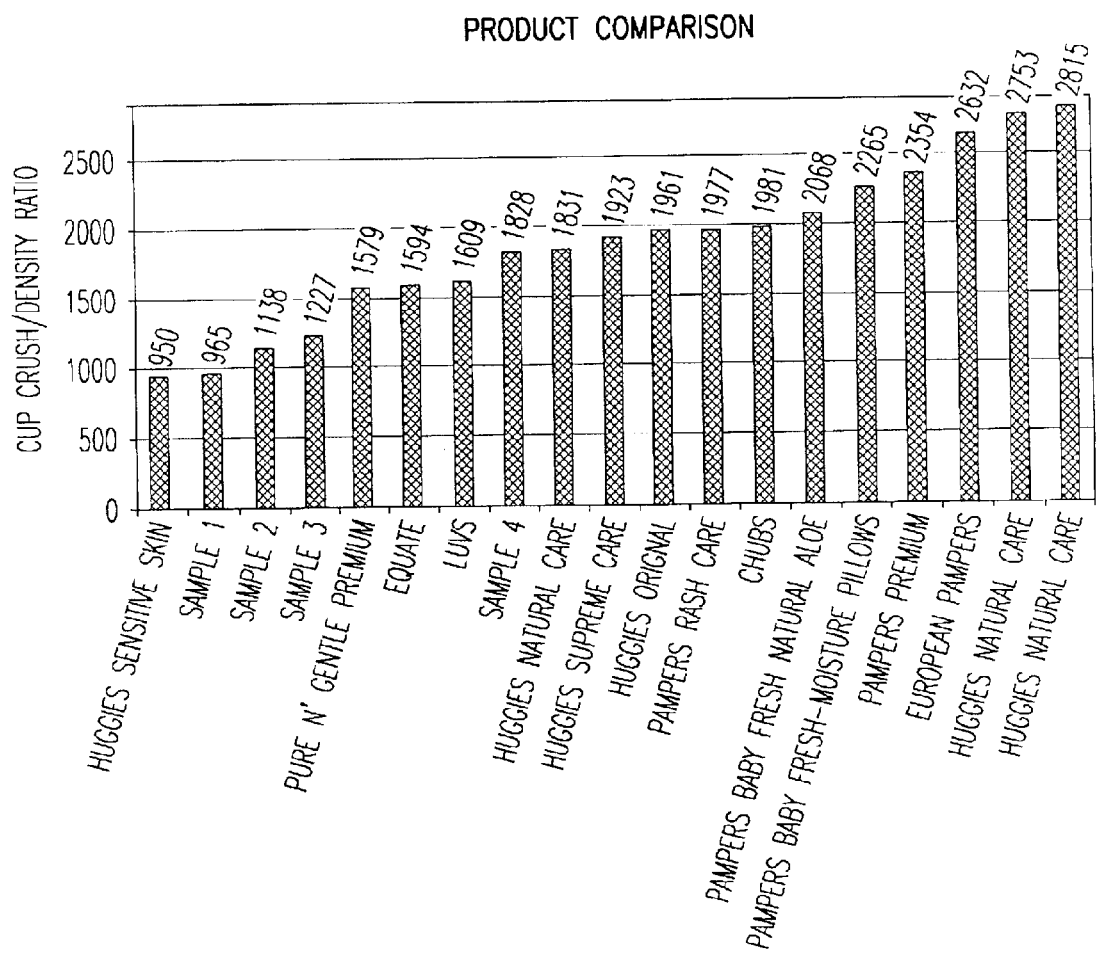
FIG. 8 is a graphic illustration of the cup crush to density ratio of several commercially available wet-wipes and the cup crush of the wet-wipes of the present invention.
Figure 9:
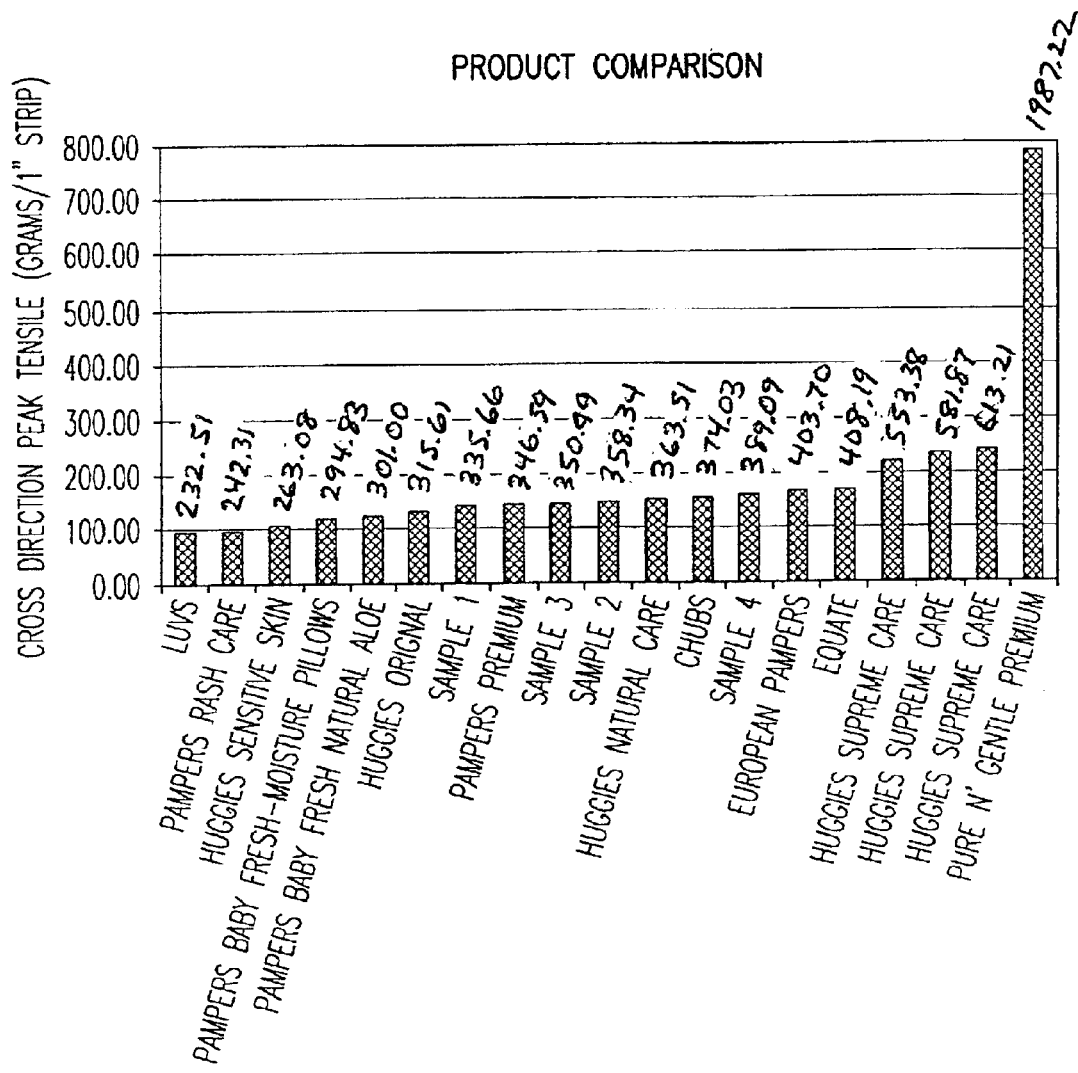
FIG. 9 is a graphic illustration of the CD tensile strength of several commercially available wet-wipes and the CD tensile strength wet-wipes of the present invention.

The cup crush, density, thickness, tensile strength, bulk and basis weight for the wet-wipes were determined. The results are summarized in Table II. The wet density of several commercially available wet-wipes and the wet density of the wet-wipes of the present invention are compared in FIG. 6. The cup crush of several commercially available wet-wipes and the cup crush of the wet-wipes of the present invention are compared in FIG. 7. The cup crush to density ratio of several commercially available wet-wipes and the cup crush to density ratio of the wet-wipes of the present invention are compared in FIG. 8. The CD tensile strength of several commercially available wet-wipes and the CD tensile strength of the wet-wipes of the present invention are compared in FIG. 9.

TABLE 1

| Product | Product Obtained from retail stores |
|---|---|
| Sample 1[a] | November 1997 |
| Sample 2[a] | November 1997 |
| Sample 3[a] | November 1999 |
| Huggies Sensitive Skin | September 1996 |
| Sample 4[a] | January 2000 |
| Luvs | 1QTR 1999 |
| Huggies Supreme Care | January 2000 |
| Pure N' Gentle Premium | December 1999 |
| Huggies Supreme Care | November 1999 |
| Huggies Natural Care | 1QTR 1999 |
| Pamper Rash Care | 1QTR 1999 |
| Equate | 1QTR 1999 |
| Huggies Supreme Care | 1QTR 1999 |
| Pampers Baby Fresh Natural Aloe | 1QTR 1999 |
| Huggies Original | 1QTR 1999 |
| Pampers Baby Fresh - Moisture Pillows | 1QTR 1999 |
| Pampers Premium | 1QTR 1999 |
| European Pampers | September 1996 |
| Chubs | 1QTR 1999 |

[a]Samples of the invention were prepared as described in Examples 1 or 2, not obtained in retail stores.

TABLE 2

Title: Wipe With Improved Clothlike Properties

| Attribute Product | Basis Wt g/m^2 | Wet Bulk mm | Cup Crush g * cm | Absorption Capacity gram/gram | CD Peak gram | CD TEA N * m/cm^2 | MD Peak Gram/cm | MD TEA N * m/cm^2 | Density Density (g/cm^3) | Cup Crush/ Density Cup Crush/Density |
|---|---|---|---|---|---|---|---|---|---|---|
| Sample 1 | 82 | 1.14 | 69.2 | 6.88 | 335.66 | *** | 233.94 | *** | 0.072 | 965 |
| Sample 2 | 82 | 1.07 | 87.5 | 5.87 | 358.34 | *** | 364.30 | *** | 0.077 | 1138 |
| Sample 3 | 86 | 1.15 | 92 | 6.12 | 350.99 | 30.448 | 320.83 | 71.201 | 0.075 | 1227 |
| Sensitive Skin | 84 | 0.75 | 106.2 | 8.99 | 263.08 | *** | 196.44 | *** | 0.112 | 950 |
| Sample 4 | 85 | 1.35 | 115 | 5.74 | 389.09 | 34.813 | 388.94 | 77.323 | 0.063 | 1828 |
| Luvs | 57 | 0.76 | 122.4 | 8.99 | 232.51 | 7.860 | 167.11 | 6.702 | 0.076 | 1609 |
| 82229 Supreme Care | 78 | 1.08 | 139 | 8.88 | 553.38 | 40.411 | 487.52 | 53.269 | 0.072 | 1923 |
| Pure N' Gentle Premium | 66 | 0.70 | 150.1 | 7.18 | 1987.22 | 56.876 | 788.05 | 22.839 | 0.095 | 1579 |
| 7366 Supreme Care | 77 | 1.30 | 163.7 | 7.77 | 581.87 | 44.352 | 487.77 | 59.042 | 0.059 | 2753 |
| Natural Care-prince | 75 | 0.83 | 165.7 | 10.38 | 363.51 | 25.142 | 309.69 | 28.127 | 0.090 | 1831 |
| Pamper Rash Care | 62 | 0.73 | 168.7 | 7.51 | 242.31 | 6.922 | 180.36 | 7.316 | 0.085 | 1977 |
| Equate | 62 | 0.57 | 174.6 | 6.53 | 408.19 | 12.141 | 322.35 | 15.027 | 0.110 | 1594 |
| Supreme Care | 80 | 1.25 | 180.9 | 8.41 | 613.21 | 43.747 | 426.89 | 47.978 | 0.064 | 2815 |
| Baby Fresh Natural Aloe | 64 | 0.71 | 188.6 | 6.97 | 301.00 | 8.037 | 193.58 | 7.881 | 0.091 | 2068 |
| Original | 79 | 0.78 | 198.6 | 8.57 | 315.61 | 21.353 | 331.80 | 22.357 | 0.101 | 1961 |
| Baby Fresh-Moisture Pillows | 64 | 0.73 | 199 | 7.03 | 294.83 | *** | 205.37 | *** | 0.088 | 2265 |
| Pampers Premium | 69 | 0.72 | 226.2 | 7.49 | 346.59 | 9.172 | 247.69 | 9.588 | 0.096 | 2354 |
| Euro Pampers | 82 | 0.84 | 255.7 | 9.24 | 403.70 | *** | 405.37 | *** | 0.097 | 2632 |
| Chubs | 65 | 0.51 | 256.3 | 3.41 | 374.03 | 8.492462 | 486.6270 | 16.87733 | 0.129 | 1981 |

*** Not Measured

FIG. 10 shows a plan view of a wet-wipe 1000 created according to the processes described herein. As discussed above, elastic fibers 1010, schematically depicted in FIG. 10 as dashed lines, extend in the machine direction (MD). Wet-wipe 1000 includes a plurality of bonding points 1020 arranged in non-linear waves which are not orthogonal to the either the machine direction (MD) indicated by arrow 1005 or the cross direction (CD) indicated by arrow 1006. For clarity of illustration, only a few bonding points 1020 are labeled with reference numerals. The bonding points 1020 are created by the bonding roller arrangement 20, 22 as the elastic layer 12 and gatherable layer 24 and/or 28 pass through the bonding roller arrangement. The wet-wipe 1000 further has decorative outlines, here shown as various forms of teddy bears, forming additional bonding areas 1030 joining at least one gatherable layer 24 or 28 to elastic layer 12. The calender roller 20, in one embodiment, includes a plurality of pins corresponding to each bonding point 1020 and bosses corresponding to outlines forming bonding areas 1030. While the illustrated embodiment has numerous bonding points 1020 and bonding areas 1030, it is understood that one embodiment requires fewer bonding points than illustrated in FIG. 10, such as only two bonding points 1020 or bonding areas 1030. Further, wet-wipe 1000 does not require both bonding points 1020 and bonding areas 1030. For example, only a plurality bonding points 1020 join the gatherable layer 24 to elastic layer 12. That is, the wet-wipe does not have bonding areas 1030. In another embodiment, only a plurality of bonding areas 1030 are provided.

All publications, patents, and patent documents cited in the specification are incorporated by reference herein, as though individually incorporated by reference. In the case of any inconsistencies, the present disclosure, including any definitions therein will prevail.

The invention has been described with reference to various specific and preferred embodiments and techniques. However, it should be understood that many variations and modifications may be made while remaining within the spirit and scope of the invention which is defined according to the claims appended hereto.

What is claimed is:

1. A wet-wipe comprising a non-woven composite elastic material comprising:
   at least one non-woven elastic layer;
   at least one non-woven gatherable layer;
   wherein the gatherable layer is bonded to the elastic layer at at least two points; and the gatherable layer is gathered between the bonded points; wherein the composite elastic material has a cup crush less than about 120 g per cubic cm and has a CD tensile strength of greater than about 0.68 pounds; and a liquid.

2. A wet-wipe comprising a non-woven composite elastic material comprising:
   at least one non-woven elastic layer;
   at least one non-woven gatherable layer;
   wherein the gatherable layer is bonded to the elastic layer at at least two points; and the gatherable layer is gathered between the bonded points; wherein the composite material has a cup crush to density ratio of less than about 1579 $cm^2$ and greater than about 950 $cm^2$; and a liquid.

3. A wet-wipe according to claim 1 or 2, wherein the elastic layer is selected form the group consisting of an elastic film, an elastic web, elastic fibers and any combination thereof.

4. The wet-wipe according to claim 3, wherein the elastic layer comprises an elastic web.

5. The wet-wipe according to claim 3, wherein the elastic layer comprises elastic fibers.

6. The wet-wipe according to claim 3, wherein the elastic layer comprises elastic fibers and a non-woven web.

7. The wet-wipe according to claim 6, wherein the elastic fibers comprise polyethylene.

8. The wet-wipe of claim 6, wherein the elastic fibers are substantially parallel.

9. The wet-wipe of claim 8, wherein the substantially parallel elastomeric filaments are autogenously bonded to at least a portion of the web fibers.

10. The wet-wipe of claim 6, wherein the elastic fibers are embedded in the web.

11. The wet-wipe according to claims 1, or 2, wherein the gatherable layer is a composite material.

12. The wet-wipe according to claim 7, wherein the gatherable layer is coform.

13. The wet-wipe of claim 11, the gatherable layer comprises polypropylene.

14. The wet-wipe of claim 11, wherein the gatherable layer is non-elastic.

15. A wet-wipe according to claim 2, wherein the composite material has a cup crush to density ratio of less than about 1400 $cm^2$ and greater than about 1100.

16. A wet-wipe according to claim 15, wherein the composite material has a cup crush to density ratio of less than about 1300 $cm^2$ and greater than about 1100.

17. The wet-wipe according to claim 2, wherein the material has a cup crush less than about 120 g cm.

18. The wet-wipe of claim 1 or 17, having a cup crush less than about 110 g cm.

19. The wet-wipe of claim 18, having a cup crush less than about 90 g cm.

20. The wet-wipe of claim 19, having a cup crush less than about 70 g cm.

21. The wet-wipe according to claim 1, wherein the material has a density less than about 0.085 g per cubic cm.

22. The wet-wipe of claims 1 or 21, wherein the material has a density less than about 0.075 g per cubic cm.

23. The wet-wipe of claims 22, wherein the material has a density less than about 0.060 g per cubic cm.

24. The wet-wipe of claims 1, wherein the material has a CD tensile strength of greater than about 0.75 pounds.

25. The wet-wipe of claim 24, wherein the material has a CD tensile strength of greater than about 0.80 pounds.

26. The wet-wipe of claim 25, wherein the material has a CD tensile strength of greater than about 0.90 pounds.

27. The wet-wipe of claim 1 or 2, wherein the basis weight of the composite elastic material is from about 75 to about 90 grams per square meter.

28. The wet-wipe of claim 27, wherein the basis weight of the composite elastic material is about 85 grams per square meter.

29. The wet-wipe of claim 27, wherein the composite elastic material comprises
   a) an elastic layer comprising elastic fibers bound to a elastic web; and
   b) two gatherable layers comprising coform;
   wherein the elastic layer is positioned between the two gatherable layers.

30. The wet wipe of claim 1 or 2, wherein the liquid is distributed within the layers; and the liquid comprises at least one material selected from the group of materials including preservatives, fragrances, emollients, humectants, detergents and soaps.

31. A wet-wipe comprising:
   a non-woven composite material comprising fibers and a polymer; wherein the composite material has a cup crush less than about 120 g per cm and a CD tensile strength of greater than about 0.68 pounds; and a liquid.

32. A wet-wipe comprising:
a non-woven composite material comprising fibers and a polymer; wherein the composite material has a cup crush density ratio of less than about 1579 cm$^2$ and greater than about 950 cm$^2$; and a liquid.

33. A wet-wipe comprising:
a non-woven composite material comprising fibers and a polymer; wherein the composite material has a cup crush to density ratio of less than about 1579 cm$^2$ and a CD tensile strength of greater than about 0.68 pounds; and a liquid.

34. A method for preparing a wet-wipe according to claim 1 or 2, wherein the wet-wipe has at least one non-woven elastic layer; and at least one non-woven gatherable layer comprising bonding the elastic and gatherable layers at at least two points.

35. The wet-wipe according to claim 7, wherein the gatherable layer comprises absorbent non-woven fibers.

36. The wet-wipe according to claim 7, wherein the gatherable layer is an homogenous mix of pulp polypropylene fibers.

* * * * *